US008381601B2

(12) United States Patent
Stumpf

(10) Patent No.: US 8,381,601 B2
(45) Date of Patent: Feb. 26, 2013

(54) TRANSDUCER MATRIX FILM

(76) Inventor: John F. Stumpf, Phoenix, AZ (US)

( * ) Notice: Subject to any disclaimer, the term of this patent is extended or adjusted under 35 U.S.C. 154(b) by 179 days.

(21) Appl. No.: 12/803,538

(22) Filed: Jun. 29, 2010

(65) Prior Publication Data

US 2010/0274447 A1     Oct. 28, 2010

Related U.S. Application Data

(63) Continuation-in-part of application No. 12/387,428, filed on May 2, 2009, now Pat. No. 8,091,437.

(60) Provisional application No. 61/269,778, filed on Jun. 29, 2009, provisional application No. 61/270,136, filed on Jul. 3, 2009.

(51) Int. Cl.
*G01D 7/00* (2006.01)

(52) U.S. Cl. .................................... 73/862.041; 73/777

(58) Field of Classification Search ............ 73/862.041–862.046, 777
See application file for complete search history.

(56) References Cited

U.S. PATENT DOCUMENTS

| | | | |
|---|---|---|---|
| 5,325,081 A * | 6/1994 | Roberts | 338/2 |
| 5,911,158 A | 6/1999 | Henderson et al. | |
| 6,707,308 B1 | 3/2004 | Michalewicz | |
| 7,532,264 B2 * | 5/2009 | Yuan et al. | 349/40 |
| 8,091,437 B2 * | 1/2012 | Stumpf | 73/862.041 |
| 2002/0073785 A1 | 6/2002 | Prakask et al. | |
| 2006/0272429 A1 | 12/2006 | Ganapathi et al. | |
| 2006/0273417 A1 | 12/2006 | Ganapathi et al. | |
| 2007/0107494 A1 | 5/2007 | Rezgui | |

OTHER PUBLICATIONS

Lichtenwalner et al., "Flexible thin film temperature and strain sensor array utilizing a novel sensing concept", Sensors and Actuators A 135 (2007) 593-597, Elsevier.
"For Computer Chips, Press "Print"", MIT Technology Insider (newletter) Apr. 2009.
http://www.omega.com/literature/transactions/volume3/strain2.html viewed Apr. 9, 2008.
http://www.nanosolar.com/printsemi.htm viewed Apr. 9, 2008.
http://www.nanosolar.com/rollprocessing.htm viewed Apr. 9, 2008.
http://en.wikipedia.org/wiki/Piezoresistor viewed Apr. 9, 2008.
http://en.wikipedia.org/wiki/Strain_gauge viewed Apr. 9, 2008.
http://www.news.wisc.edu/12718 viewed Apr. 9, 2008.
Sampath et al., "Innovative Multifunctional Concepts Enabled by Novel Fabrication Strategies" report dated Oct. 1, 2006.
http://www.omega.com online strain gauge catalog pages created Apr. 26, 2007.

* cited by examiner

*Primary Examiner* — Max Noori
(74) *Attorney, Agent, or Firm* — Snell & Wilmer L.L.P.

(57) ABSTRACT

A transducer system includes a plurality of transducer elements formed on a flexible substrate with localized circuit elements and interconnects associated with each transducer element.

2 Claims, 28 Drawing Sheets

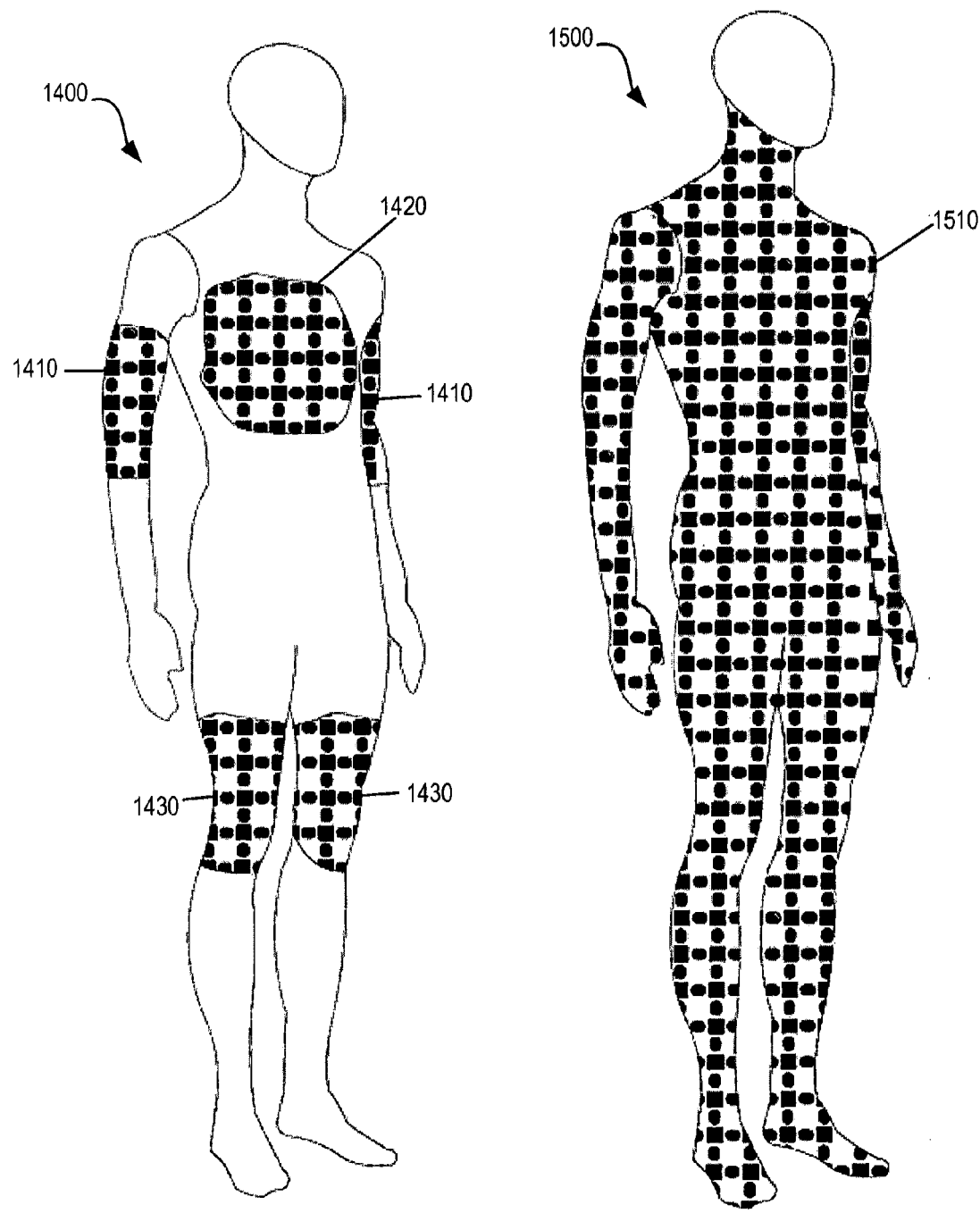
*FIG. 14*          *FIG. 15*

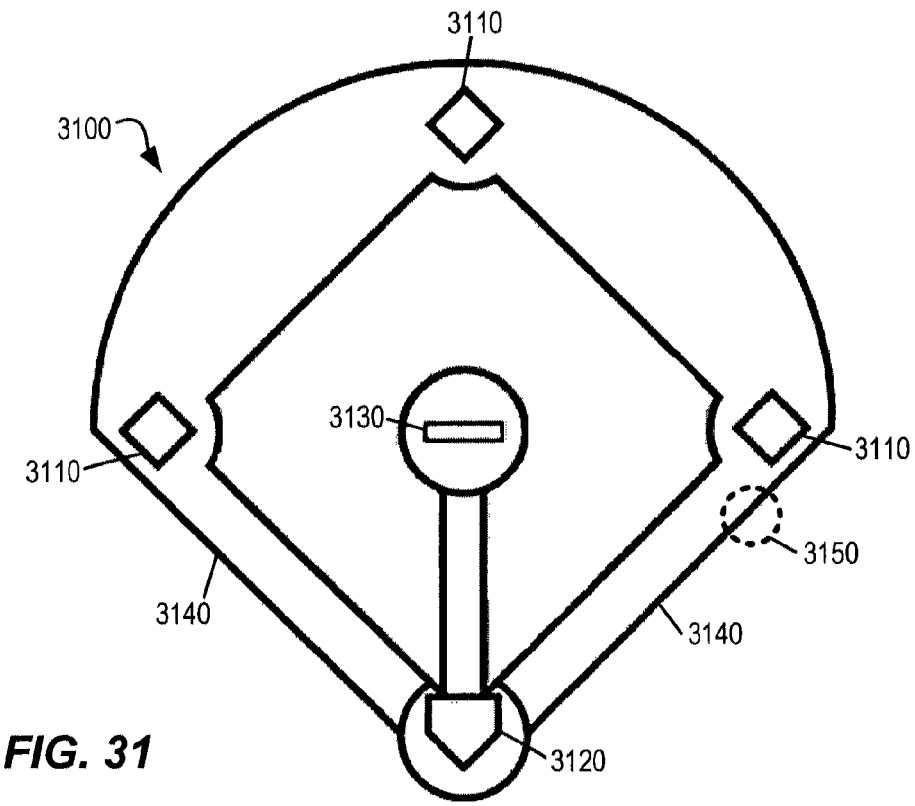
FIG. 31
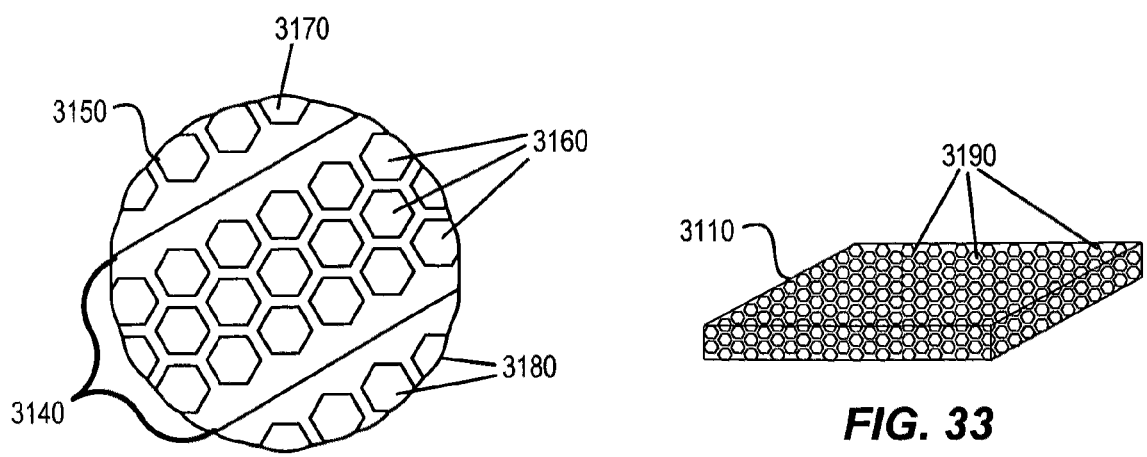
FIG. 32
FIG. 33

TRANSDUCER MATRIX FILM

CROSS-REFERENCE TO RELATED APPLICATIONS

This patent application is a continuation-in-part of and claims priority to commonly-owned and co-pending U.S. patent application Ser. No. 12/387,428, filed May 2, 2009, which claims priority to U.S. Provisional Patent Application Ser. No. 61/050,524 filed May 5, 2008. This patent application also claims priority to U.S. Provisional Application Ser. No. 61/269,778, filed Jun. 29, 2009 and U.S. Provisional Application Ser. No. 61/270,136, filed Jul. 3, 2009. Each of the above-mentioned patent applications is incorporated herein by reference.

BACKGROUND

The present disclosure relates to arrayed transducer systems with sensory measurement and actuation capabilities. Transducers may be designed to measure and/or actuate in response to a multitude of sensory information such as strain, temperature, light and electromagnetic radiation. Strain is a geometrical measure of the deformation of an object resulting from an applied stress. Stress may be applied to an object, for example, via mechanical contact, aerodynamic forces, hydrodynamic forces and/or changes in temperature. Resultant strain and therefore the applied stress may be measured by use of various types of strain gauge sensors.

Temperature is an inherent property of all objects. Temperature of an object may be changed by the addition or subtraction of heat. Temperature may be measured by the use of temperature sensitive elements such as strain gauges, resistive temperature detectors ("RTDs"), thermistors and thermocouples. Light may be emitted by devices such as photodiodes, lasers, light emitting diodes ("LEDs") and sensed by devices such as photodiodes, phototransistors and solar cell elements.

Electromagnetic radiation such as radio frequency ("RF") energy may be emitted or sensed by the use of RF antennae such as used for radio frequency identification ("RFID") systems. Transduction of sensory information such as temperature and imparted forces are important for characterizing a wide variety of systems and processes including mechanical systems such as fabrication machines, vehicles and aircraft in both static and dynamic environments as well as human and/or animal motion. Measurement and actuation capabilities also provide methods for measuring change and incorporating feedback in monitored systems.

SUMMARY

In an embodiment, an accessory for sports equipment includes a plurality of transducer elements formed on a flexible substrate, localized circuit elements associated with each of the plurality of transducer elements and a plurality of interconnects associated with the localized circuit elements; the accessory removeably affixed with the sports equipment and supplying sensory data from the sports equipment.

In an embodiment, a modified article of sports equipment includes an unmodified article of sports equipment, a plurality of transducer elements formed on a flexible substrate connected with the unmodified article of sports equipment, localized circuit elements associated with each of the plurality of transducer elements and a plurality of interconnects associated with the localized circuit elements. The unmodified article of sports equipment may be any one of balls, bats, clubs, boxing gloves, hoops, nets, backboards, sports fields, sports courts and baseball bases, etc.

In an embodiment, a fault tolerant transducer system includes a plurality of transducer elements formed on a flexible substrate, localized circuit elements associated with each of the plurality of transducer elements and a plurality of interconnects associated with the localized circuit elements wherein the cellular form of the transducer system permits failure of one or more cells within the transducer system without disabling operation of the entire transducer system.

In an embodiment, a sensor system for a tire includes a plurality of transducer elements formed on a flexible substrate, localized circuit elements associated with each of the plurality of transducer elements and a plurality of interconnects associated with the localized circuit elements, the transducer elements transducing sensory information relating to functional parameters of the tire.

In an embodiment, an instrumented tire has an improvement including a plurality of transducer elements formed on a flexible substrate, localized circuit elements associated with each of the plurality of transducer elements and a plurality of interconnects associated with the localized circuit elements the flexible substrate, the localized circuit elements and the interconnects integrated with the tire.

In an embodiment, a method for fabricating a portion of transducer matrix film includes providing a substrate for the transducer matrix film and associating elements of the transducer matrix film with the substrate via any of the following processes: forming, printing, stamping, depositing, patterning, exposing, etching and bonding.

In an embodiment, a control system for a semiconductor processing machine includes a plurality of transducer elements formed on a flexible substrate, localized circuit elements associated with each of the plurality of transducer elements and a plurality of interconnects associated with the localized circuit elements wherein the flexible substrate is connected with a carrier or platen.

In an embodiment, a transducer system includes a plurality of transducer elements formed on a flexible substrate, localized circuit elements associated with each of the plurality of transducer elements and a plurality of interconnects associated with the localized circuit elements, the transducer system powered via at least one of the following sources: piezoelectric sources, thermoelectric sources, photovoltaics, batteries, capacitors, electroactive polymers, photovoltaic textiles, RF power, energy harvesting, inertia systems and nanogenerators.

In an embodiment, a control system for a photovoltaic system includes a plurality of transducer elements formed on a flexible substrate, localized circuit elements associated with each of the plurality of transducer elements and a plurality of interconnects associated with the localized circuit elements the control system connected with and monitoring the photovoltaic system.

In an embodiment, a control system for a fluid-dynamic system includes a plurality of transducer elements formed on a flexible substrate, localized circuit elements associated with each of the plurality of transducer elements and a plurality of interconnects associated with the localized circuit elements the transducer system connected with and monitoring the fluid-dynamic system wherein the fluid-dynamic system may be any of the following: wind turbines, propellers, fans, air movers and duct systems.

In an embodiment, a control system for a vehicle includes a plurality of transducer elements formed on a flexible substrate, localized circuit elements associated with each of the plurality of transducer elements and a plurality of interconnects associated with the localized circuit elements, the transducer system connected with and controlling actively or passively at least one subsystem of the vehicle.

In an embodiment, a sensor system for a surface includes: a plurality of transducer elements formed on a flexible substrate, localized circuit elements associated with each of the plurality of transducer elements and a plurality of interconnects associated with the localized circuit elements, the transducer system integrated with the surface and providing sensory information for navigation, security, presence detection, traffic flow analysis, workplace time studies and object tracking.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIGS. 14 and 15 are three-dimensional views of humans showing applications of transducer matrix film, in accordance with an embodiment.

FIG. 31 is a plan view of a baseball diamond including transducer matrix film, in accordance with an embodiment.

FIG. 32 is an enlarged view of a portion of the baseball diamond of FIG. 31 showing details of a modified foul line including transducer matrix film, in accordance with an embodiment.

FIG. 33 is a three-dimensional view of a baseball base including transducer matrix film, in accordance with an embodiment.

DETAILED DESCRIPTION OF ILLUSTRATED EMBODIMENTS

To overcome the shortcomings of prior art systems, the present invention generally includes a system and method for transducing sensory information such as strain, temperature, light and electromagnetic radiation. Transducing sensory information may be defined as measuring and/or actuating in response to sensory information. Prior art systems often are designed only for uni-axial sensing, not measurement and actuation, are not stand-alone and require external systems for signal conditioning, etc. For example, U.S. Pat. No. 5,911,158, (hereinafter, the "'158 patent"), entitled PIEZOELECTRIC STRAIN SENSOR ARRAY, describes a piezoelectric strain sensor array formed from polyvinylidene fluoride ("PVDF") film for use in monitoring dynamic responses of a physical structure such as aircraft. The '158 patent describes strain sensor arrays which "can be easily made in various sizes and smaller sizes can be easily made by simply cutting larger sizes with a scissors." The article "Flexible thin film temperature and strain sensor array utilizing a novel sensing concept" by Lichtenwalner et al. describes the design and fabrication of flexible arrays of resistive temperature and strain sensors on polyimide sheets. Sensor Products Inc. of Madison, N.J. and Tekscan, Inc. of South Boston, Mass. provides a variety of products for pressure sensing such as Tactilus®, Sigma-NIP® (SPI) and I-Scan® (Tekscan).

These prior art systems have complex wiring arrangements and delocalized signal processing which limits their functionality for in situ and/or remote applications. The present invention describes transducer matrix film: arrayed transducer elements formed on a flexible substrate in association with localized circuitry for processing signals to/from transducer elements, for identifying locations of transducer elements within an assembly of transducer elements and for simplifying interconnects and communication to external devices. Other advantages of the current invention will be described below in association with embodiments.

Figure 1:
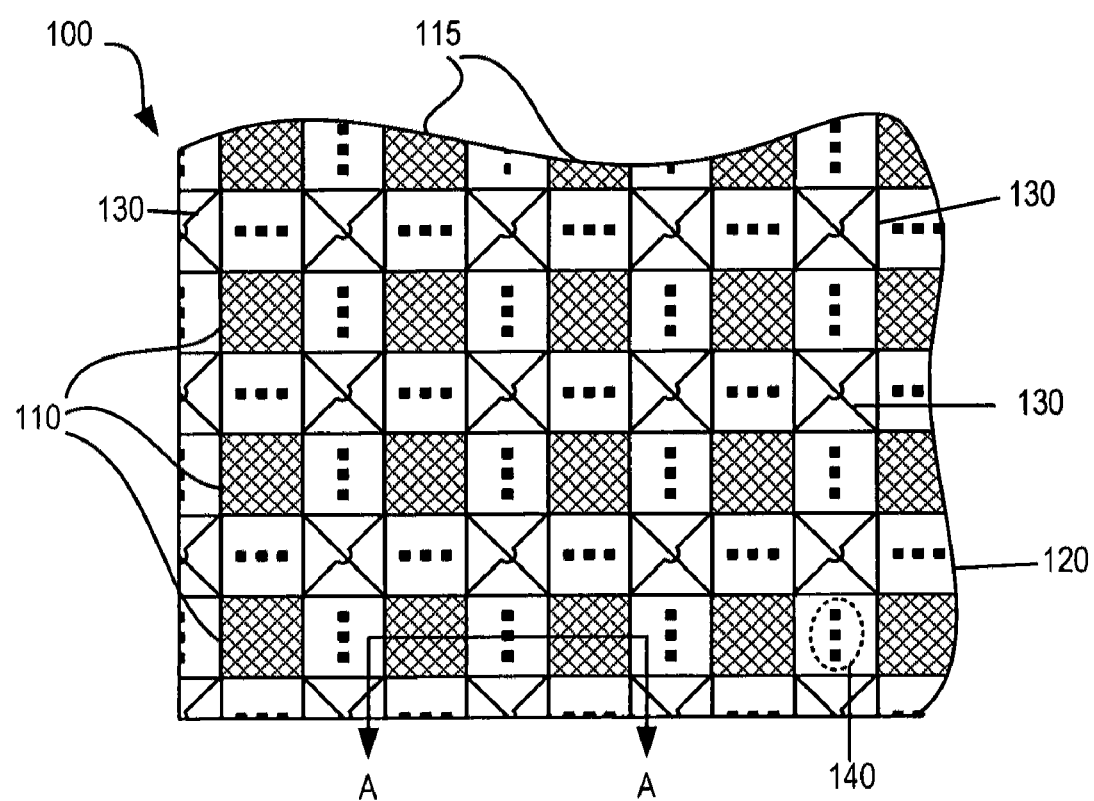
FIG. 1 is a plan view of a portion of transducer matrix film including square transduction cells organized into a regular square array, in accordance with an embodiment.

FIG. 1 shows a plan view of a portion of transducer matrix film 100 including a plurality of square transduction cells 110 organized into a regular square array. For illustrative clarity, not all transduction cells 110 in FIG. 1 are labeled. Partial transduction cells 115 may be transduction cells that are damaged or truncated due to cutting of transducer matrix film 100 and may therefore be inoperable. For illustrative clarity, not all partial transduction cells 115 in FIG. 1 are labeled. Each transduction cell 110 may include one or more transducer elements such as light, RF energy or strain sensing elements, light, RF energy or strain actuating elements, temperature sensing elements and/or temperature actuating elements. Each transduction cell 110 may also include integrated circuitry for conditioning signals to/from transducer elements. Integrated circuitry within each transduction cell 110 may also function to identify a unique position for each transduction cell 110 within transducer matrix film 100. Transduction cells 110 are described in further detail herein below with respect to FIG. 5.

Transducer matrix film 100 provides transduction (sensory data measurement and/or sensory actuation) at discrete locations over an extent of transducer matrix film 100. Transduction cells 110 may all be of the same or similar construction, layout and functionality. For example, all transduction cells 110 of transducer matrix film 100 may be formed of the same materials, each may include a strain sensing element and each may transfer sensory data via RF circuitry. Alternatively or additionally, transduction cells 110 may be of varied types and geometries as discussed herein below. For example, transducer matrix film 100 may include interlaced transduction cells 110 that either sense strain or actuate light emitting diodes ("LEDs") or elements of a flexible display, touch screen or other haptic interface.

Transducer matrix film 100 may be formed on substrate 120 which may be a flexible materials, in solid, woven, nonwoven, bonded or other forms, such as metals, textiles, plastics, ceramics, glasses, polyimide, polyamide, polyethylene terephthalate ("PET"), PVDF, polyethylene, polypropylene, polyaryletheretherketone ("PEEK"), Mylar™ and/or other polymers or composites of any of the aforementioned materials. Substrate 120 may be defined as flexible when a first dimension (e.g., thickness) of substrate 120 is substantially smaller than second and third dimensions (e.g., length and width) of substrate 120. Typical substrate thicknesses may be on the order of tens of microns (e.g., 50 microns or approximately 0.002 inches). Thickness of substrate 120 may be determined appropriately with respect to the needs of an application. A conformal application may require a substrate with high flexibility whereas application to planar rigid surfaces may utilize thicker substrates.

Transducer matrix film 100 may also include interconnects 130 which permit communication between transduction cells 110 and/or external devices (not shown). For illustrative clarity, not all interconnects 130 in FIG. 1 are labeled. Interconnects 130 may be utilized as power interconnects, ground interconnects, signal interconnects, addressing interconnects, intra-cell interconnects and inter-cell interconnects. Interconnects 130 may be electrical interconnects formed from electrically conductive materials such as copper or other metals by sputtering, plating, chemical vapor deposition and/or physical vapor deposition followed by patterning and etching. Alternatively, interconnects 130 may be optical interconnects such as light pipes, fiber optic cables or IR send/receive pairs designed to transport optical signals or RF interconnects for transporting radiative signals.

Connection points 140 may be located with respect to transduction cells 110 to permit connection of external signals such as power, ground and signal (cell addressing and data). Connection points 140 may each be associated with one or more transduction cells 110 and cell addressing, data signals and/or power may be time or frequency multiplexed onto common lines. All connections points 140 used for power may be connected via interconnects 130 so that power may be applied at any connection point 140 for supplying entire transducer matrix film 100 with electrical power. In like manner, all connection points 140 used for ground connections may be connected via interconnects 130 as well as all connection points 140 used for signal connections may be connected via interconnects 130. Therefore, each connection point 140 may be considered to be connected to a power, ground, address or signal "bus."

Connection points 140 may be further simplified by using power and ground interconnects as carriers for modulated address and data signals with proper filtering and signal detection. Although shown on a regular grid between transduction cells 110, connection points 140 may be distributed throughout transducer matrix film 100 to allow external connection to any size piece of transducer matrix film. Alternatively, to the use of physical electrical connections, wireless connections in the form of RF or optical may be used to transmit power and signals between external devices (not shown) and transducer matrix film 100 or between transduction cells 110. For example, interconnects 130 may be designed to include RF antennae to permit RF transmission. Likewise for optical transmission, interconnects 130 may be designed to include photodiodes. Transmission elements may also be formed within transduction cells 110 or in other locations on or within substrate 120. External devices used with transducer matrix film 100 may include, but are not limited to, computers, data acquisition systems, microcontrollers, power supplies, humans, animals, robotic operators and/or any other devices or systems for providing power or handling (send/receive) analog or digital signals. External devices may be free-standing devices physically or functionally separable from transducer matrix film 100 or may be integrated or integrable devices such as wristband 1630 described below in association with FIG. 16.

Transducer matrix film 100 may be as large in extent as required or desired. Mass-produced sheets of transducer matrix film 100 may be sized using cutting, slitting and/or dicing equipment or may simply be cut with shears. Elements of transducer matrix film 100, such as interconnects 130 and transduction cells 110, may be directly formed on flexible substrate 120 by ink-jet printing technologies such as those available from Kovio of Milpitas, Calif. which provides ink-jet printing for manufacturing circuit components. Related processes for printing elements of transducer matrix film 100 may include the "silicon ink" technologies from Innovalight of Sunnyvale, Calif. which is used for the production of solar cells by JA Solar of Shanghai, China. Alternatively, processes such as strained silicon or silicon germanium membranes developed by researchers at the University of Wisconsin-Madison which permit a thin flexible membrane of material to be removed from the originally thick semiconductor substrate upon which it was originally built, may provide integrated circuits which may be bonded to flexible substrate 120 to form transduction cells 110 of transducer matrix film 100. Roll-to-roll processing technologies and equipment, such as used by Nanosolar, Inc. of San Jose, Calif. for Copper Indium Gallium Selenide photovoltaic technology may be used for forming elements of transducer matrix film 100 and has been shown to provide low cost for large area films. Elements of transducer matrix film such as transduction cells, memristors, power generators and electrical connections may also be produced, for example, by the micropatterning systems described in the article "Mechanical devices stamped on plastic" from the web at www.nanotech-now.com dated Mar. 1, 2010 which discusses technology development for MEMS replication at MIT. Micropatterning technologies combined with printed semiconductors may yield highly cost effective large scale manufacturing for transducer matrix films.

A summary of some of the possible fabrication methods for TMF are listed in Table 1. below. It should be understood that Table 1 is in no way exhaustive of possible fabrication techniques or combinations of fabrication steps. Any of the processes listed in Table 1 may be changed in order, replaced and/or combined with alternative methods known in the art for the manufacture of semiconductor components, flexible circuits and sensors.

TABLE 1

| | circuit(s) | transducer(s) | interconnect(s) | power |
|---|---|---|---|---|
| print | yes | yes | yes | yes |
| stamping, forming | yes | yes | yes | yes |
| metal depositing, patterning, exposing, etching | yes | yes | yes | yes |
| dielectric depositing, doping, patterning, exposing, etching | yes | yes | yes | yes |
| bonding | yes | yes | yes | yes |

Figure 2:
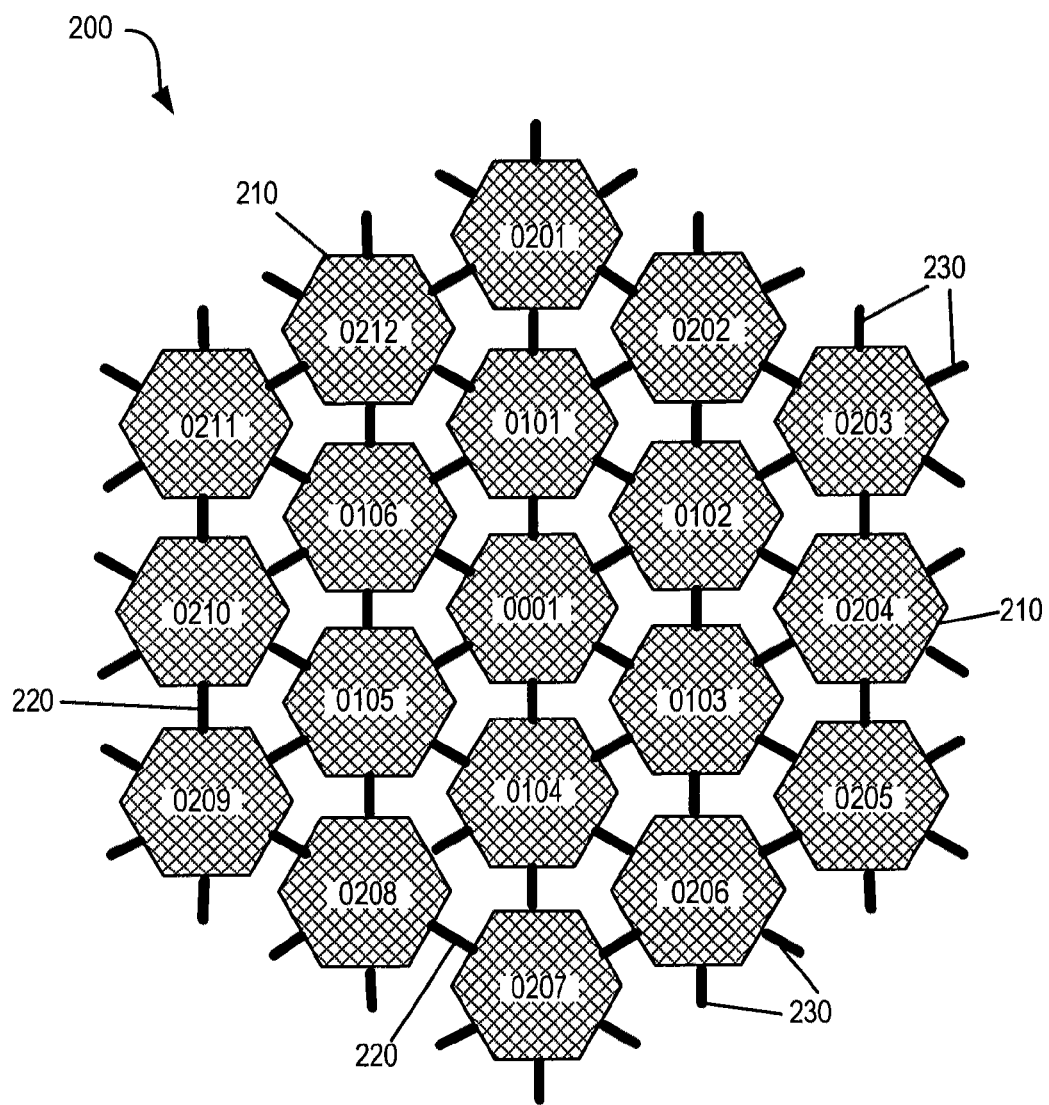
FIG. 2 is a plan view of a portion of transducer matrix film including hexagonal transduction cells organized into a hexagonal array, in accordance with an embodiment.

FIG. 2 shows a plan view of a portion of transducer matrix film 200 including a plurality of hexagonal transduction cells 210 organized into a regular hexagonal array. Interconnects 220 permit communication between transduction cells 210 and/or external devices (not shown). Truncated interconnects 230 may not be used to provide communication to neighboring cells that have been removed from portion of transducer matrix film 200 as shown. However, the lack of connected transduction cells to truncated interconnects 230 may permit transduction cells 210 to determine an extent of transducer matrix film 200 and terminate address coding as described herein below. Additionally, truncated interconnects 230 may be used to connect with external devices. Although transducer matrix film 200 is shown in FIG. 2 as a regular array of hexagonal transduction cells 210; it should be understood that any regular or irregular arrangement of transduction cells may be designed and used. Additionally, it should be understood that transduction cells may be of any suitable geometry, size and shape. For example, transducer matrix film may include transduction cells shaped as spherical lunes for conformal application to spherical objects. It should be noted that not all cells 210 nor all interconnects 220 and 230 are labeled.

Figure 3:
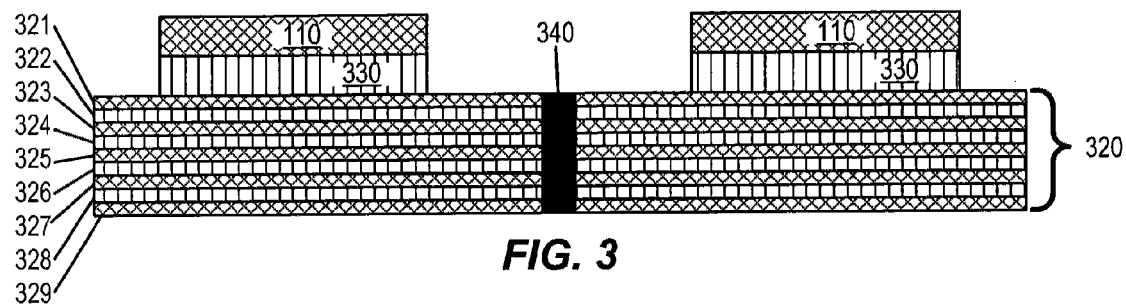
FIG. 3 is a cross-sectional view of a portion of the transducer matrix film of FIG. 1 along section line A-A showing further details of the transducer matrix film, in accordance with an embodiment.

FIG. 3 shows a cross-sectional view of a portion of transducer matrix film 100 of FIG. 1 along section line A-A showing further details of transducer matrix film 100. Transducer matrix film 100 may include any number of transduction cells 110 which may be attached with flexible substrate 320 via interconnection layer 330. Due to the inclusion of semiconductor elements or additional layers of material, transduction cells 110 may be of generally higher modulus than flexible substrate 320. Sizing and positioning of transduction cells 110 and variations in thickness and material of substrate 320 permit variation of the net modulus of transducer matrix film 100 over a wide range based upon the application requirements. It should be noted that for illustrative clarity, elements of FIG. 3 may not be drawn not scale. For example, interconnection layer 330 may be considerably thinner than substrate 320 and/or transduction cells 110. Furthermore, although shown attached with substrate 320 via interconnect layer 330; transduction cells 110 may be directly formed on a surface of or within substrate 320.

Interconnection layer 330 may provide electrical as well as mechanical connection of transduction cells 110 with flexible substrate 320. Interconnection layer 330 may utilize bump bonding, conductive and/or non-conductive adhesives or other methods to provide electrical, optical and/or mechanical connection for transduction cells 110 with substrate 320. Interconnects which permit communication between neighboring cells and or external devices may be formed within substrate 320 as a series of bonded and patterned conductive layers each isolated by insulating layers. For example, layers 321, 323, 325, 327 and 329 of substrate 320 may be insulating layers. Additionally, layer 322 may be a ground layer, layer 324 may be a power layer, layer 326 may be a address signal layer and layer 328 may be a data signal layer. One or more of connection point 340 may be located with respect to transduction cells 110 to permit connection of external signals such as power, ground, address and data. Connection point 340 may be connected to one or more layers of substrate 320 and multiple connection points may exist for any layer.

Figure 4:
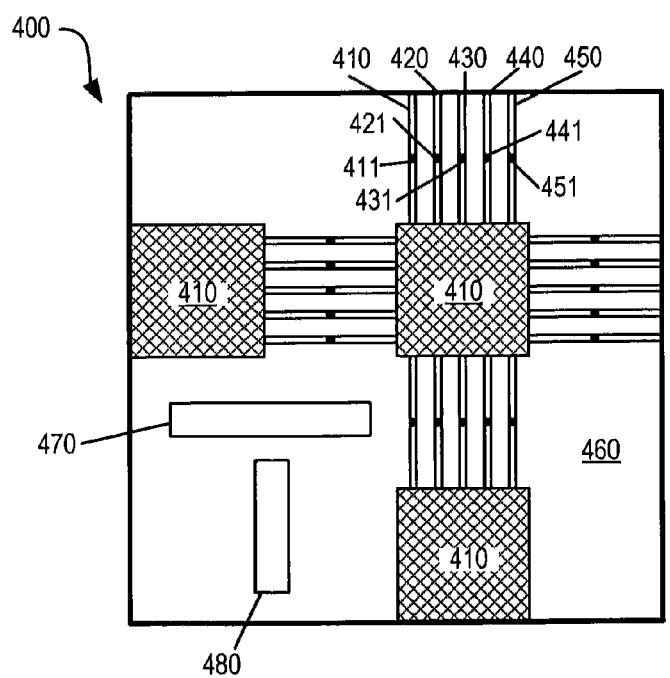
FIG. 4 is a portion of transducer matrix film showing alternate details of interconnects between cells, in accordance with an embodiment.

FIG. 4 shows a portion of transducer matrix film 400 showing alternate details of interconnects between transduction cells 410 and external devices (not shown). Whereas FIG. 3 above describes interconnects formed of layers within a bonded structure of substrate 320. Interconnects 410, 420, 430, 440 and 450 may be formed in a single layer patterned upon a surface of monolithic substrate 460. Although connection points 411, 421, 431, 441 and 451 are shown each localized to a portion of interconnects 410, 420, 430, 440 and 450, respectively; entire surfaces of interconnects 410, 420, 430, 440 and 450 may be designed as connection points. Regardless of where transducer matrix film 400 may be cut, locating interconnects 410, 420, 430, 440 and 450 upon a single surface of substrate 460 may permit ease of connection to external devices since interconnects 410, 420, 430, 440 and 450 and connection points 411, 421, 431, 441 and 451, respectively, may be designed to accept a flexible flat cable connector such as FI-series connectors from JAE Electronics or other types on connectors for signals and power.

In addition or optionally to any transducer elements within transduction cells 410, transducer elements 470 and 480 such as strain gauges may be positioned on any surface of substrate 460 which does not include interconnects 410, 420, 430, 440 and 450 or transduction cells 410. Transducer elements 470 and 480 may be connected with interconnects 410, 420, 430, 440 and 450 or transduction cells 410 via additional interconnects (not shown).

Any of interconnects 410, 420, 430, 440 and 450 may also integrate transducer elements such as strain gauges whereby combining sensory data transduction with signal transport. For example, a strain gauge transducer element may provide an analog signal proportional to an applied strain while transporting a digital signal to an external device. Interconnects shown in FIGS. 4 and 5, such as interconnects 410 and 505 respectively, may not be required if transduction cells 110 include localized power and signal transmission capabilities such as the RF and optical elements described herein. Furthermore, combinations of layered and single layer interconnects as described in association with FIGS. 3 and 4 may be used.

Figure 5:
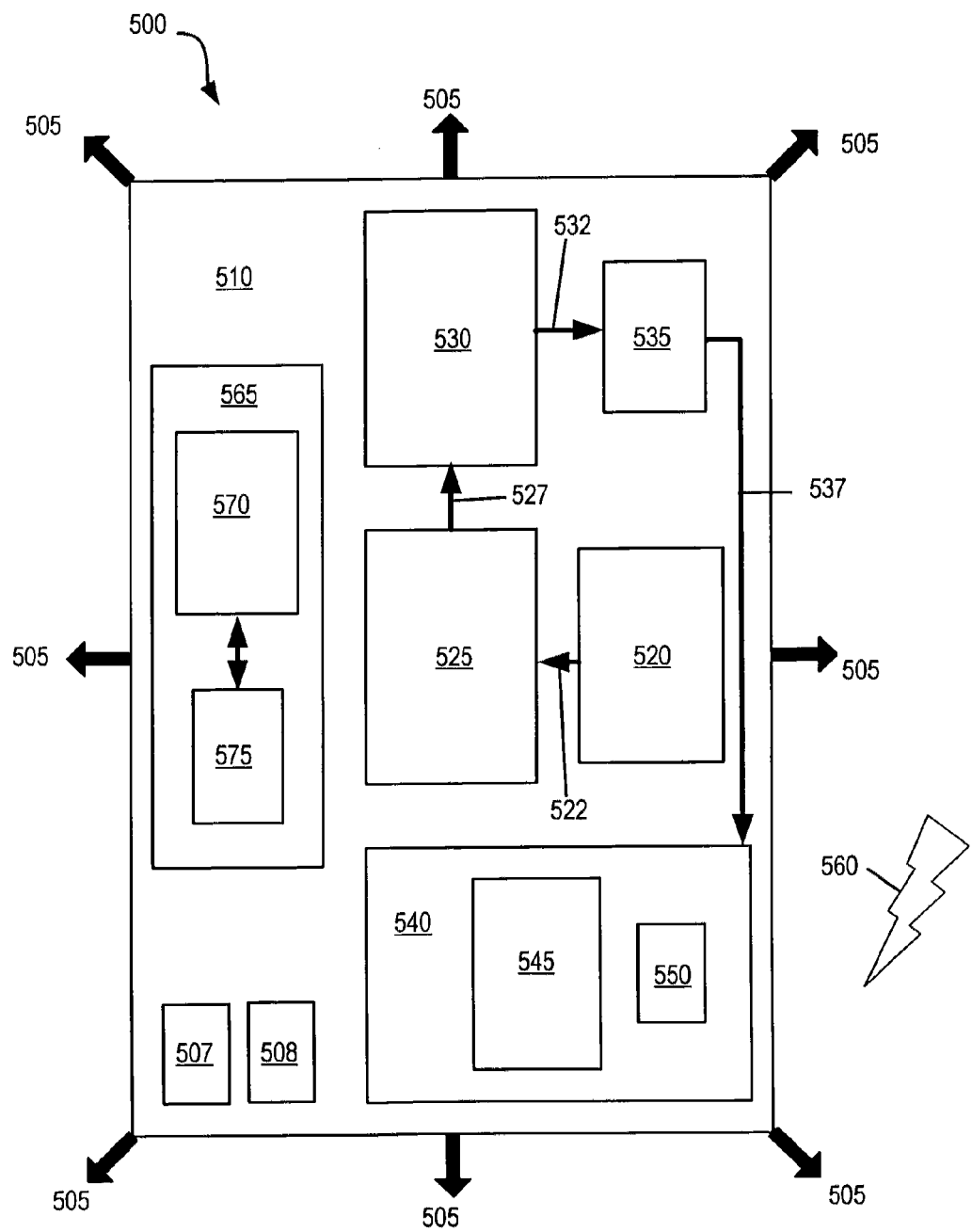
FIG. 5 is a detailed block schematic of elements of a transduction cell of transducer matrix film, in accordance with an embodiment.

FIG. 5 shows a detailed block schematic of components of transduction cell 500 of transducer matrix film such as transducer matrix film 100 of FIG. 1. For illustrative clarity, not all connections between elements are shown in FIG. 5. Transduction cell 500 may be formed upon a surface of substrate 510 that is subsequently bonded with a flexible substrate, such as substrate 460 of FIG. 4, to form an array of transduction cells. Substrate 510 may be, for example, a thinned semiconductor, a portion of a flex-circuit substrate or other substrates described herein, such as substrate 460 of FIG. 4.

Transduction cell 500 may be connected with one or more other transduction cells (not shown) or external devices via interconnects 505 (represented by heavy black arrows).

Transduction cell 500 and any elements contained therein may receive power via power elements 507 and 508. For example, power element 507 may be a connection to external power signals and power element 508 may be a connection to external ground signals. Power elements 507 and 508 may be connected to any of interconnects 505. Alternatively power elements 507 and 508 may include capacitors with photocells or RF antennae which may be used to charge the capacitors whereby eliminating any need for external power connections. Power elements 507 and 508, if configured for use as RF elements, may be multiplexed to both supply power as well as to provide communication ability to/from transduction cell 500 for cell addressing and/or data transfer.

Transduction cell 500 may include one or more transducer element 520 which may be, for example, strain and/or temperature transducing elements such as metallic strain gauges, piezoelectric elements, piezoresistive elements, elastoresistive elements, MEMS structures, heating elements, tunneling magnetoresistive elements, bi-material structures, pressure sensitive ink elements, thermocouples, thermistors, resistive thermal devices ("RTDs"), optical emitters or detectors and/ or quantum tunneling transducer devices such as described in U.S. Pat. No. 6,707,308. Transducer element 520 may transduce stimuli including, but not limited to, stress, pressure, shear, strain, light, heat, electromagnetic energy, RF radiation and temperature.

As an example, suitable designs of sensing strain gauge elements produced upon flexible substrates are available from Omega Engineering, Inc. of Stamford, Conn. including series SGD of 5 micron thick Constantan foil on 20 micron thick polyimide substrate and KFG series of 6 micron thick Constantan foil on 15 micron thick Kapton substrates. Additionally or alternatively, transducer element 520 may be an actuating element such as a thin film resistive heating element or memory metal device.

Transduction cell 500 or any portion of transducer matrix film may include circuit elements such as logic circuits, processors, digital-to-analog converters, analog-to-digital converters, memory elements, power storage elements, wireless communication elements, RFID elements, optical elements, active electrical elements and passive electrical elements such as described herein. Circuit elements may perform function such as processing signals of transducer elements, identifying positions of transducer elements within an array of transducer elements, simplifying interconnects, communicating amongst transducer elements and communicating with external devices.

Transducer element 520 acting as a sensing transducer element may provide signal 522 which may be routed to one or more of signal conditioning element 525. Signal conditioning element 525 may be a device or electrical structure such as Wheatstone bridges, Chevron bridges, 4-wire circuits and constant current sources, passive and/or active electrical circuit elements and electrical filters. Conditioned signal 527 may be routed to analog-to-digital conversion element 530 which may convert conditioned signal 527 into a digital signal with a defined bit-depth such as 8 or 12 bits. Analog-to-digital conversion element 530 may be, for example, a linear or logarithmic analog-to-digital converter which provides functionality such as that provided by those available from Analog Devices, Inc. of Norwood, Mass.

Digital signal 532 may be routed to digital signal conditioning element 535 which may, for example, adjust digital signal voltage levels to be compatible with external devices or transmission protocols. Either or both digital and analog signal conditioning may involve changes to signals to account for temperature compensation, signal creep, hysteresis, noise reduction, signal offset and other known factors. Conditioned digital signal 537 may be routed to output signal generation element 540 where it may be encoded for transfer to external devices. Output signal generation element 540 may include functionality such as available in the ADM202 CMOS RS-232 200 kBPS Transceiver from Analog Devices, Inc. of Norwood, Mass.

Output signal encoding may incorporate a transduction cell address code with conditioned digital data 537 to provide an output signal on an interconnect 505 and to a connection point such as connection point 140 of FIG. 1. An output signal may also include additional data such as checksums for error detection and/or correction. Transfer of an output signal may be determined by the use polling, triggering or other channel access methods including code domain multiple access ("CDMA"), frequency domain multiple access ("FDMA") and time domain multiple access ("TDMA"). For sequential transfer of signals from one or more transduction cells, timer element 545 may form a unique time delay offset from the origin cell for each cell based upon its cell address code.

Cell triggering for data transmission (send or receive) as well as for data measurement or actuation may be performed by electrical, mechanical, electromagnetic or optical signals dependant upon a triggerable element 550. Triggerable element 550 may be, for example, an electrical contact point for receiving an analog or digital trigger pulse, a mechanical switch, a magnetic pick-up coil, an RF antenna or a photodetector. For example, optical signal 560 may be used to trigger triggerable element 550 which a configured as a photodetector. An analog or digital trigger pulse may be supplied from an external device via any of interconnects 505. Optionally, triggerable element 550 may be a logic circuit that compares a data signal level to a stored or predefined value to decide whether or not to transfer a signal, actuate or measure data.

Transduction cell address code generation element 565 may include processor 570 and memory 575. Processor 570 may be used to calculate cell address codes based upon an origin code and adjacent cell codes all of which may be stored in memory 575 which may be, for example, a printed non-volatile ferroelectric polymer memory such as provided by Thin Film Electronics ASA of Norway. Each cell may store a unique cell address code which may be indicative of its position on a portion of transducer matrix film. Additionally or optionally to elements previously described above, processor 570 may also provide delay generation and signal formatting for output signal generation.

Although described above in association with transducer element 520 as a sensing transducer element, it should be understood that transducer element 520 may be an actuating transducer element. In the case of transducer element 520 being an actuating element; signal communication and functionality of elements may be suitably modified from the above description. For example, instead of receiving an unconditioned signal from sensing transducer element 520; signal conditioning element 525 may provide a conditioned signal to actuating transducer element 520.

Transduction cell 500 may contain any, all or none of the above described elements. Furthermore, elements of transduction cell 500, described above may be considered functional or organizational rather than physical since any or all elements of transduction cell 500 may be included within a single microcontroller such as a PIC or ARM device. Certain elements, such as processor 570, may be shared amongst a group of transduction cells. Localization of elements, described above, to each transduction cell 500 permits operability of any portion of transducer matrix film with at least one cell whereas shared elements may limit operability to certain cells or portions of transducer matrix film.

Figure 6:
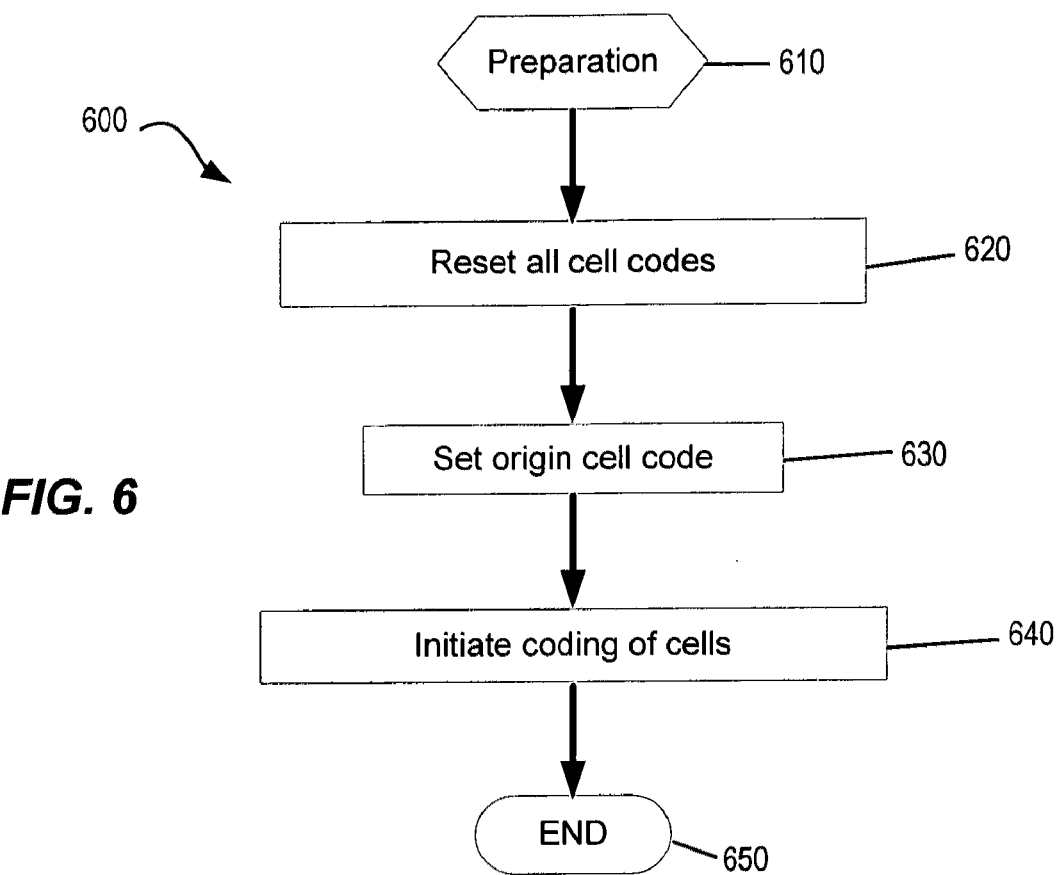
FIG. 6 is a flow chart of a process for address coding of transduction cells of transducer matrix film, in accordance with an embodiment.

FIG. 6 shows a flow chart of a process 600 for configuring and address coding of transduction cells of transducer matrix film. Process 600 prepares a portion of transducer matrix film for use and may be done anytime before use. If memory, such as memory 575 of FIG. 5, included with each transduction cell is non-volatile (i.e., flash memory); cell address codes may be set during manufacture and may remain through the lifetime of transducer matrix film.

Process 600 initiates with step 610 wherein any necessary or optional setup and preparation steps may be performed. Setup and preparation operations may include cutting a portion of transducer matrix film to size; supplying external connections such as power, ground and signal to a portion of transducer matrix film; or charging power capacitors for each cell. Once any preparatory operations are completed; process 600 advances to step 620 wherein one or more cell address codes are reset. A cell address code may be reset, for example, by supplying a signal on an interconnect and overwriting an existing cell address code with a default code. For example, all transduction cells may be set with an address code of "88" by introducing a signal onto an interconnect whereby triggering each transduction cell to set its address to "88". By reading adjacent cell address codes each transduction cell is able to determine that cell address codes are in a default state since all cell address codes are identical. Alternatively, a cell address code may be cleared or set into a state where a value is undefined or defined outside of normal bounds. For example, a data register may be set into a tristate condition or a flag variable may be set in memory. In this example, it may not be necessary to reset any cell address codes but set a flag instead.

Next in step 630 an origin cell address code is set into a specific cell that is required or desired to be defined as an origin for a section of transducer matrix film. Origin cell address coding may be performed by electrical, magnetic, mechanical, RF or optical methods. For example, an origin cell address may be set electrically by providing a signal for setting the origin code on an interconnect, such as interconnect 505 of FIG. 5; mechanically by providing a localized application of force or optically using a light signal such as optical signal 560 of FIG. 5. More than one origin cell may be defined.

Subsequent to setting an origin cell code, process 600 advances to step 640 wherein cell address coding of all transduction cells other than an origin cell is initiated. Cell address coding may be performed, for example, by introducing a signal on an interconnect to activate all transduction cells to read adjacent cell address codes. Circuit elements in each transduction cell may then determine if that transduction cell is able to determine a cell address code and if so, what the cell address code is. Cell address coding may following automatically subsequent to setting and origin cell code or may be otherwise prompted to occur.

Figure 7:
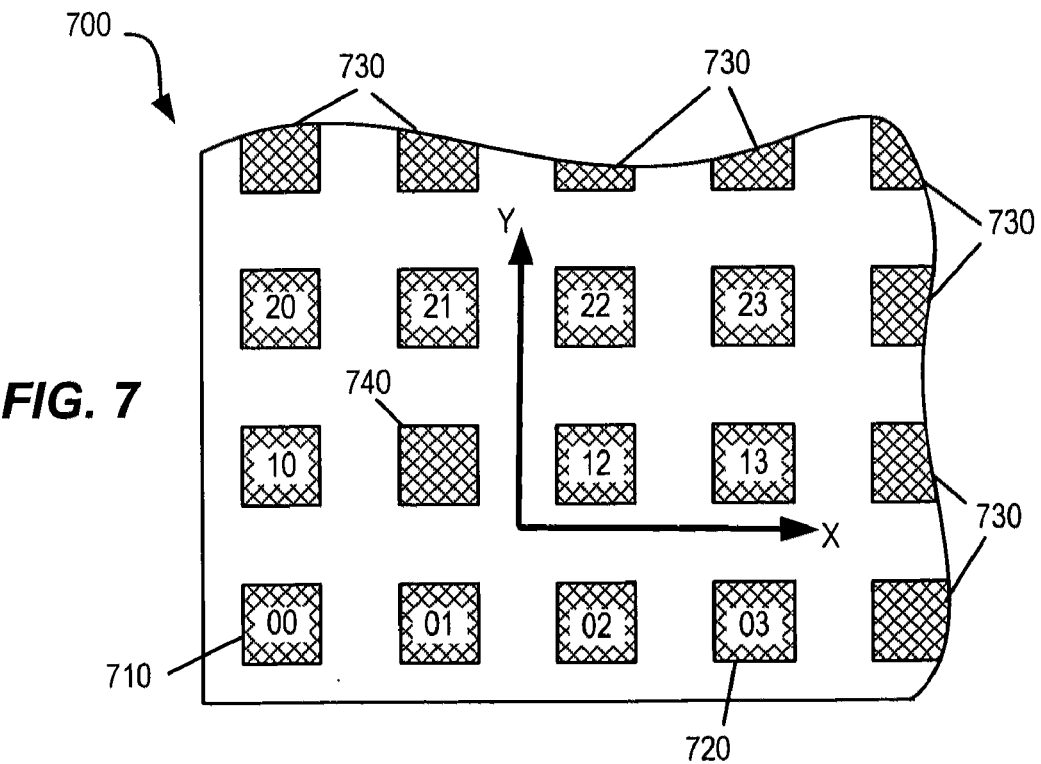
FIG. 7 is a block schematic of a portion of transducer matrix film showing addresses coded via utilizing the process shown in FIG. 6, in accordance with an embodiment.

As an example of cell address coding consider FIG. 7 with all cell address codes, other than the origin cell, initially set to a default value of "88". Once cell address coding is initiated only transduction cells coded as "01" and "10" in FIG. 7 are able to set cell address codes since other transduction cells read the default cell address code from neighboring cells. Once transduction cells address coded as "01" and "10" are cell address coded; transduction cells address coded as "20", "21", "02", and "12" are able to cell address code since these transduction cells will detect cell address codes in certain adjacent transduction cells to be different from the default cell address code. Subsequently transduction cells address coded as "03", "13", "22" and "23" are able to cell address code. Upon successful cell address coding each transduction cell may record its current cell address code into its memory.

The sequence of initiated cell address codings may be automatic for each iteration or successive signals may be introduced via interconnects and for each signal sent each transduction cell determines if it can assign a cell address code and what the cell address code may be. Each iteration of cell address coding expands the group of address coded cells from an origin cell until all available or active transduction cells have a unique address code. Process 600 terminates with end step 650 following cell address coding of all available or active transduction cells. Step 650 may include actions such as testing a section of transducer matrix film prior to use.

FIG. 7 shows a block schematic of a portion of transducer matrix film 700 showing cell addresses coded via utilizing process 600 shown in FIG. 6. Since transducer matrix film 700 is organized into a regular rectangular array, cell address codes may be encoded using a simple Cartesian addressing scheme as shown in FIG. 7. Origin cell 710 is defined as cell address code "00" and other transduction cells may be defined with respect to their ordinal offset from origin cell 710 projected along orthogonal axes XY as indicated. For example, transduction cell 720 is cell address coded as "03" since it is located along the same row (Y=0) as origin cell 710 and is three units removed from origin cell 710 along the X-axis (X=3). Although origin cell 710 is shown located in a corner of transducer matrix film 700, it may be located at any transduction cell position containing an active transduction cell. Furthermore, more than one origin cell may be defined for any portion of transducer matrix film.

Inactive transduction cells 730 may not be cell address coded either due to an inability of cell address coding as a result of damage due to cutting or due to lack of interconnects (not shown) which inhibit the ability to determine a cell address code. Transduction cell 740 although not proximate to a cut edge of the film may be otherwise inactive and therefore not cell address coded. It should be noted that cell address coding functionality can determine the existence of inactive transduction cell 740 and permit appropriate cell address coding for other transduction cells. Transduction cells adjacent to inactive transduction cell 740 may transmit information regarding that transduction cell 740 is inactive whereby maintaining the ability to properly positionally reconstruct any data. Additionally, data which would otherwise come from an inactive transduction cell, such as cell 740, may be interpolated/extrapolated from adjacent cells where data is available. The cellular form of transducer matrix film with data interpolation/extrapolation permits failure of one or more cells within the system without disabling operation of entire said transducer system whereby providing a fault tolerant transducer system. For known arrangements of cells, such as the regular array shown in FIG. 7, cell address coding may not be required and sequential ordering may provide inherent row/column addressing although additional row/column addressing interconnects may be required.

Alternatively cell address coding may not follow a Cartesian addressing scheme. Returning to FIG. 2, a circular coding scheme may be utilized with a hexagonal arrangement of transduction cells. In this geometry an origin cell with cell address code "0001" may be first defined and additional cell address codes are set in concentric rings of cells around the origin cell. For example, as shown, the first ring around the origin cell has cell codes in the form of "01xx." The second ring around the origin has cell codes in the form of "02xx." A third ring around the origin may be cell address coded with codes in the form of "03xx." Additional cells would coded in like manner with increasing initial code index with each subsequent ring of cells. All cells may be initially be set to a default code such as "0000" so that when a cell queries an adjacent cell and receives a "0000" code back the cell may determine that the queried adjacent cell has not been encoded.

Figure 8:
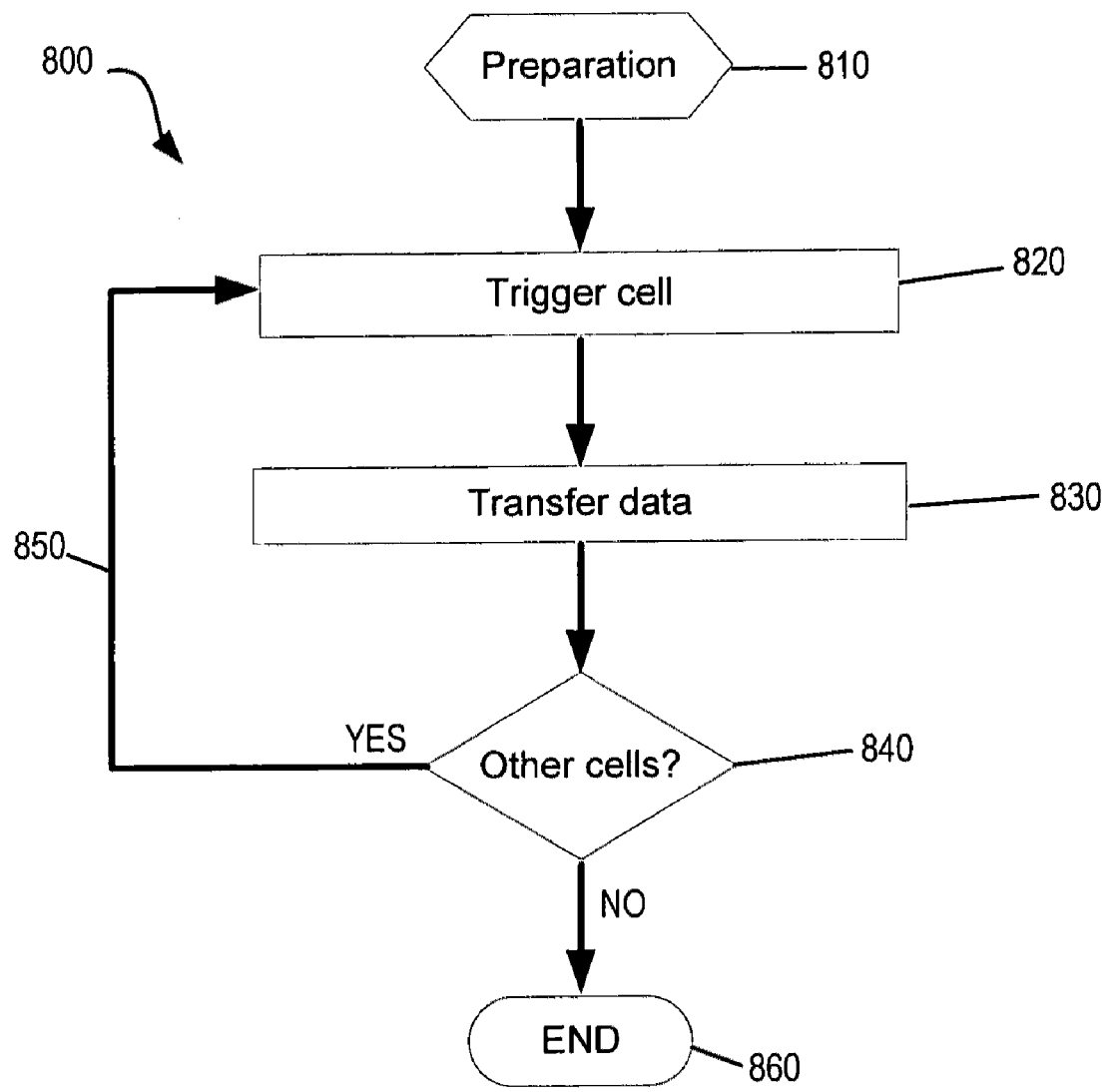
FIG. 8 is a flow chart of a process for transferring data to/from transducer matrix film, in accordance with an embodiment.

FIG. 8 shows a flow chart of a process 800 for transferring data to/from transducer matrix film. Process 800 initiates with step 810 wherein any necessary or optional setup and preparation steps may be performed. Setup and preparation operations may include cutting a portion of transducer matrix film to size, applying external power, ground and signals to a portion of transducer matrix film, charging power capacitors for each cell and/or performing cell address coding as described herein above with respect to FIGS. 2, 6 and/or 7.

Subsequent to any preparatory steps, process 800 advances to step 820 wherein a trigger signal is introduced to each cell. A trigger signal may be a digital electrical signal on an interconnect which includes a cell address code or other data permitting a specific transduction cell (or group of transduction cells) to respond. Alternatively or optionally, a trigger signal may be introduced to any transduction cell by transmission of RF energy or shining a light of a certain frequency, such as 800 nm infrared ("IR") light, on one or more transduction cells. A photodetector on any transduction cell, such as triggerable element 550 of FIG. 5, which receives light may activate that transduction cell. In this way selected portions of transducer matrix film may be triggered and an entire transducer matrix film does not have to be accessed. Furthermore, any portion of transducer matrix film may be self-triggered based upon sensory data transduced by the transducer matrix film.

Following application of a trigger signal, process 800 advances to step 830 wherein transfer of data is initiated. When a transduction cell receives a trigger signal, it may wait a certain period of time based on its unique cell address code and then send or receive a signal containing a cell identifying address code, a data signal and error detection and/or correction information. A unique delay determined for each transduction cell may prevent multiple signals to/from multiple transduction cells being on interconnects simultaneously. Transducer matrix film may also incorporate a software/hardware flow control protocol such as XON/XOFF as is used for modem control or other protocols to permit multiple external devices and/or multiple transduction cells to share signal interconnects.

Process 800 continues to step 840 and determines if more transduction cells require data transfer. If more transduction cells require data transfer, process 800 returns to step 820 via loop 850 and another transduction cell is triggered; otherwise, if no more transduction cells require data transfer, process 800 advances to step 860 and data transfer is terminated. Although described above with respect to data transfer, process 800 may also be used for triggering measurement by or actuation of transduction cells of transducer matrix film. For example, a series of triggers may be sent to a transduction cell to initiate a series of measurements, of which an average value may be transferred at a later time.

Figure 9:
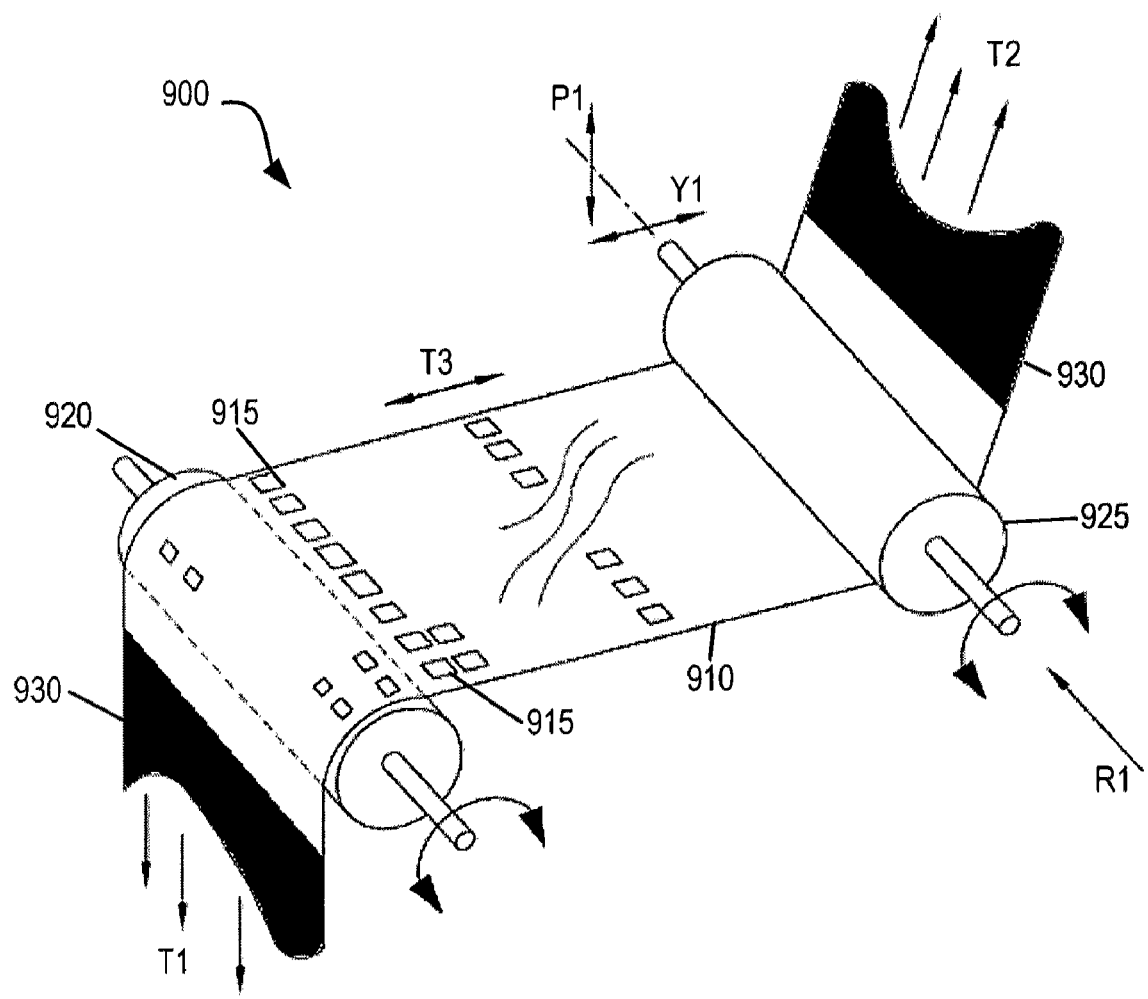
FIG. 9 is a simplified three-dimensional view of a roll-to-roll processing machine utilizing transducer matrix film, in accordance with an embodiment.

FIG. 9 shows a simplified three dimensional view of an exemplary roll-to-roll processing machine 900 utilizing transducer matrix film 910 spliced into process film 930. A roll-to-roll processing machine may be defined as any machine that unrolls a process film, performs actions on that process film and then re-rolls the process film. A process film for use with a roll-to-roll processing machine may be defined as a material that has one of its 3 dimensions substantially smaller than the other 2 dimensions. Process film may be made from metal, polymers, paper, cloth, etc. or combinations thereof. Examples of roll-to-roll processing machines include, but are not limited to, machines for processing paper (printing presses and paper making machines), tape processing machines, flex-circuit processing machines, metal film processing machines, converter machines, flexible semiconductor processing machines, solar cell fabrication machines and machines for protective films, plastics and textiles. Other machines that are not roll-to-roll machines but which however utilize rollers to manipulate process films may utilize transducer matrix film 910 as discussed below.

As shown in FIG. 9, roll-to-roll processing machine 900 has rollers 920 and 925 which support, guide and/or change direction of process film 930 as it is processed. Alignment of rollers 920 and 925 may be important to ensure that process film 930 tracks properly through machine 900. For example, process film 930 should not ride off an end of roller 920 or 925, should be even (no wrinkles), should not "bag" due to low or no tension areas and should not break due to excessive localized tension above a yield point of process film 930.

Example tensions applied to transducer matrix film 910 and process film 930 are denoted T1, T2 and T3. Tension T1 may be associated with the drag associated with a "take-off" roll (not shown) and an acceleration of process film 930 through machine 900. Tension T2 may associated with the wind-speed associated with a "take-up" roll (not shown) and an acceleration of process film 930 through machine 900. Tension T3 (shown in FIG. 9 applied to transducer matrix film 910 in place of process film 930) may be associated with positional and dynamic properties of one or both of rollers 920 and 925. Tension T3 may be a three dimensional tension field affected over all portions of transducer matrix film 910 or process film 930 by parameters of rollers 920 and 925. Eccentricity, rotational speed variation, alignment error, non-cylindricity, slippage between roller and process film and other irregular parameters of rollers 920 and 925 such as static and dynamic properties of roller alignment, roller pressure, roller eccentricity, process film tension, process film tension gradient, roller deflection, roller uniformity, roller-to-film traction, roller-to-film slippage, process film catenary sag and roller diameter which may cause improper processing of process film 930 may be determined by employing transducer matrix film 910 to measure tensions affected by machine 900.

Prior art methods for diagnosis and/or controlling irregular parameters of rollers include aligning rollers in pitch (up and down) and yaw (side to side) axes by leveling (roller pitch axis only), measurement between rollers with "Pi" tape or other mechanical methods, laser alignment using surveying techniques, 3-axis inertial locating systems, etc. For example, roller 925 may be positionally adjusted, relative to roller 920, by moving roller 925 along pitch axis P1 and/or yaw axis Y1. Existing measurement systems have limitations such as limited physical or line-of-sight access to rollers 920 and 925 or process film 930 which do not allow physical measurement or visual (laser) observation. Additionally, existing measurement systems may be too large or prohibitively expensive to use. Furthermore, existing measurement systems measure positions and parameters of rollers to infer process film tension gradients rather then performing a direct measurement of process film tension. Transducer matrix film 910 including strain sensing transduction cells 915 may directly measure fundamental quantities of process film 930, such as tension gradient which govern operation of roll-to-roll processing machine 900.

Although the foregoing example describes transducer matrix film 910 spliced into film 930, it should be understood that transducer matrix film 910 may be otherwise utilized in machine 900. For example, transducer matrix film 910 may be sized, spliced and used alone or bonded onto a portion of process film 930.

Figure 10:
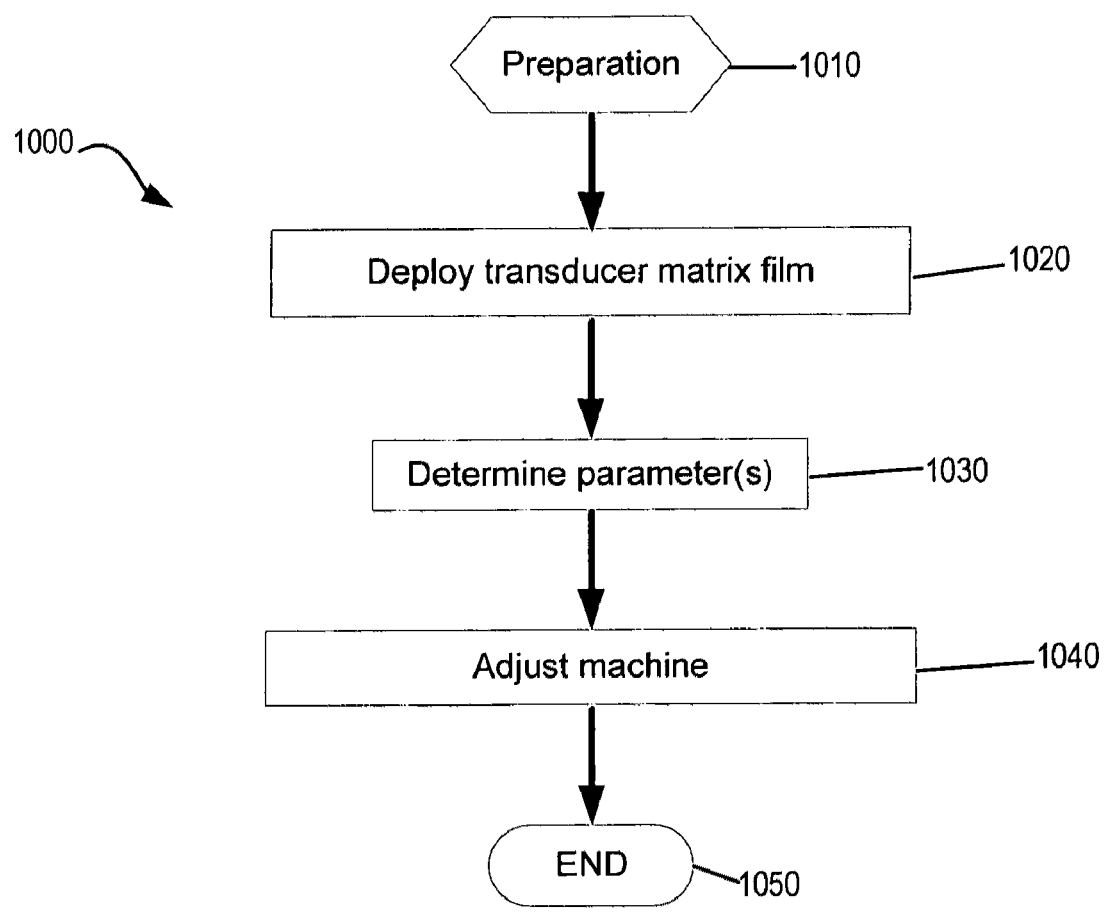
FIG. 10 is a flow chart of a process for configuring a roll-to-roll processing machine using transducer matrix film, in accordance with an embodiment.

FIG. 10 shows a flow chart of process 1000 for configuring or diagnosis of a roll-to-roll processing machine using transducer matrix film. Process 1000 starts with step 1010 wherein any necessary or optional setup and preparation steps may be performed. Setup and preparation operations may include preparation of transducer matrix film as described herein and/or any required initial configuration of the roll-to-roll processing machine such as initial placement and roller alignment. Preparation may also include selecting a transducer matrix film with a tensile modulus of elasticity which is appropriate to the process film to be processed on the machine. Polyimide or Mylar™ may be suitable substrate materials for many applications of transducer matrix film. Stainless steel or other metallic foils may be used as substrates for transducer matrix film if a higher modulus is required.

Process 1000 next advances to step 1020 wherein transducer matrix film is deployed by "threading" into a roll-to-roll processing machine. An active area of transducer matrix film, preferably, should match a width of the intended process film and should be somewhat longer than a maximum distance between any two sequential rollers. However, the active area of transducer matrix film does not have to extend the entire length or width of a process film path through a machine since it may be moved to different areas of the process film path and/or machine as required.

Once a properly sized portion of transducer matrix film has been deployed various processing parameters of a machine may be determined during step 1030 via static and dynamic measurement. For example, a process film including a portion of transducer matrix film may be held static with tension applied at a level applicable to processing of the process film. The tension gradient may then be measured. Other static parameters such as uniformity, diameter and deflection of rollers may be measured utilizing transducer matrix film by fixing the position of transducer matrix film at a set distance from a roller and measuring strains imparted to the transducer matrix film.

For dynamic measurements, transducer matrix film may measure parameters such as process film wrinkling, bagginess, sag and dynamic tension gradients; and time derivatives of any order of the motion of the process film and process film tensions. For example, standing waves may exist in process films while being processed by a machine. Transducer matrix film, substituted for or included with process film may directly measure tensions associated with these standing waves. In another example, inertial and frictional drag forces effecting the spin of a roller may be determined by measuring tension across transducer matrix film before and after a roller at varying linear accelerations of the transducer matrix film. In still another example, transducer matrix film may also be run periodically to collect data for preventative maintenance which may indicate, due to measured changes in tension, that a roller bearing is going "bad" (friction increasing or varying) before it can cause a problem.

After parameters are determined within step 1030, measured parameters and derived values may be used to adjust the processing machine for improved performance during step 1040. A processing machine may be adjusted by modifying machine components such as rollers in pitch and yaw or changing rotational speeds of roller to yield the desired tension gradient across a process film. Alternatively, components of a machine may be replaced, as in the above example of a failing roller bearing, or repaired, as for resurfacing of a roller. Steps 1020, 1030 and 1040 may be iterated for different or same portions of a machine as necessary or desired. Process 1000 terminates with step 1050 wherein any shutdown operations are performed, such as removing transducer matrix film from a machine and performing test runs of process films.

Transducer matrix film may be applied to outer surfaces of objects such as airplanes, cars and boats to determine mechanical forces such as contact or impact and/or fluid-dynamic (aerodynamic and/or hydrodynamic) forces, such as lift, drag or buoyancy forces, affecting the object by measuring resultant strain. Transducer matrix film may be designed to measure strain which is applied in any direction. For example, measured strains orthogonal to the plane of transducer matrix film may be defined as pressure on the transducer matrix film and measured strains in-plane (shear strains) relate to lateral forces parallel to a surface of transducer matrix film. Strain may be measured in three orthogonal directions or may be measured in projected directions such as for aerodynamic streamlines. Transducer matrix film is therefore applicable for evaluation and testing of designs and modifications to objects to replace wind tunnel or other fluid-dynamic testing with real-world measurement under realistic conditions rather than simulated. For example, transducer matrix film applied to a surface of an automobile may be used to transduce data for aerodynamic drag out on the open road and collect data in real-time.

Figure 11:
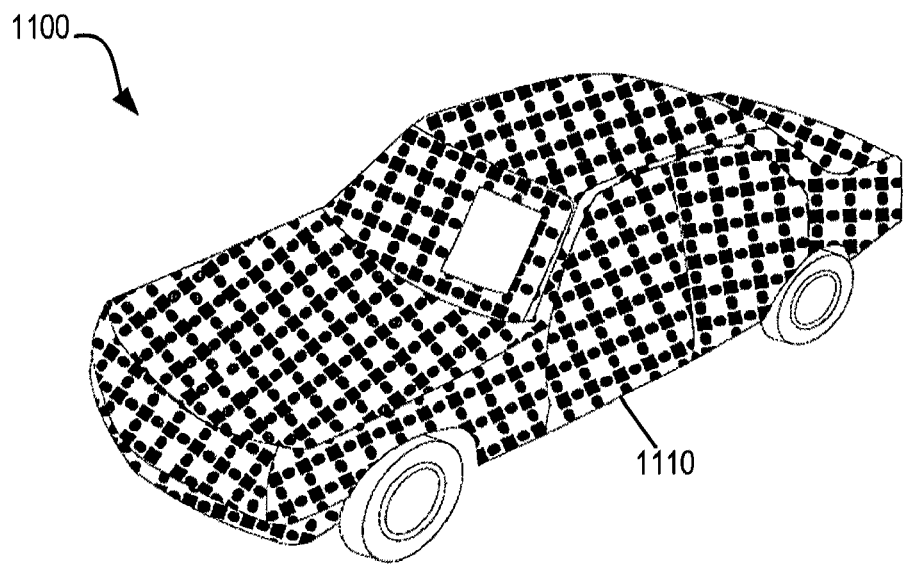
FIG. 11 is a three-dimensional view of an automobile showing application of transducer matrix film, in accordance with an embodiment.
Figure 12:
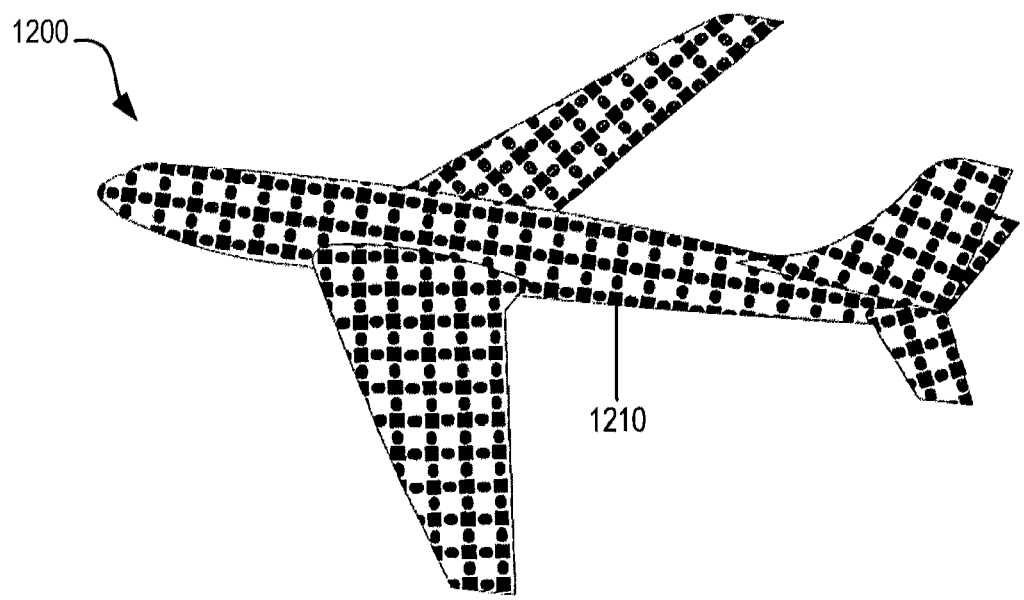
FIG. 12 is a three-dimensional view of an aircraft showing application of transducer matrix film, in accordance with an embodiment.

FIG. 11 shows a three-dimensional view of automobile 1100 showing application of transducer matrix film 1110. FIG. 12 shows a three-dimensional view of aircraft 1200 showing application of transducer matrix film 1210. For visual clarity, elements of transducer matrix films 1110 and 1210 are enlarged in scale with respect to the dimensions of automobile 1100 and aircraft 1200. Although shown in FIGS. 11 and 12, covering most exterior surfaces of automobile 1100 and all exterior surfaces aircraft 1200, respectively; transducer matrix films 1110 and 1210 may be positioned and sized to any portion of automobile 1100 and aircraft 1200. Additionally, sizes and geometries of transduction cells for either transducer matrix film 1110 or 1210 may be sized appropriately for the conditions and/or properties to be measured.

Applied to inner or outer controllable surfaces of wings or fuselage or built into fiberglass composite structures of aircraft; transducer matrix film may be used, in association with an actuator, as a feedback sensor for active control of wings, flaps, rudders, airfoils and fuselage surfaces. Most aircraft currently change the shape of wings and rudders with separate mechanical flaps/rudders. Utilizing transducer matrix film, an aircraft may be designed that has a uninterrupted outer skin and the shape of the aircraft surfaces may be changed by actuation of the surface in response to strain and/or temperature data provided by transducer matrix film as a feedback sensor to an actuation system when a portion of the surface is altered or when acted upon by external forces. Examples of actuators which may be used with transducer matrix film as components of an actuation system may include pneumatic cylinders or bladders; hydraulic cylinders or bladders; or linear or rotational electric actuators. Such actuators may be attached to the outer surfaces of aircraft via linkages or other mechanical means to amplify the transduced sensory data from transducer matrix film to the surfaces.

Additionally, measuring lift and aerodynamic forces and pressures in real-time may provide for optimum efficiency and enhanced stability of the aircraft. For example, transducer matrix film may be applied to currently existing variable wing aircraft or to "lifting body" aircraft such as the B2 bomber to monitor strains and temperatures effecting outer surfaces as a safety system. Additionally, new variable wing aircraft designs may be enabled by transducer matrix films. Transducer matrix film may also be used to detect wing icing by monitoring changes in pressure, tension or temperature of a wing surface due to ice build-up or thermally induced contraction.

A transducer matrix film including both strain sensing elements and actuating heating elements may be able to automatically detect icing and heat a wing surface. This design of transducer matrix film may form a self-contained and stand-alone transducer system which may not require the use of external devices except for, potentially, initial cell addressing or other configuration.

In addition to aircraft, transducer matrix film may be used to actuate controllable surfaces of fluid-dynamically controllable vehicles such as automobiles, gliders, drones, motorcycles and watercraft. Applied to airdams, spoilers or other deformable outer surfaces of automobile 1100, transducer matrix film 1110 may be used to control the drag and down force in real time based on feedback from transducer matrix film 1110.

Figure 13:
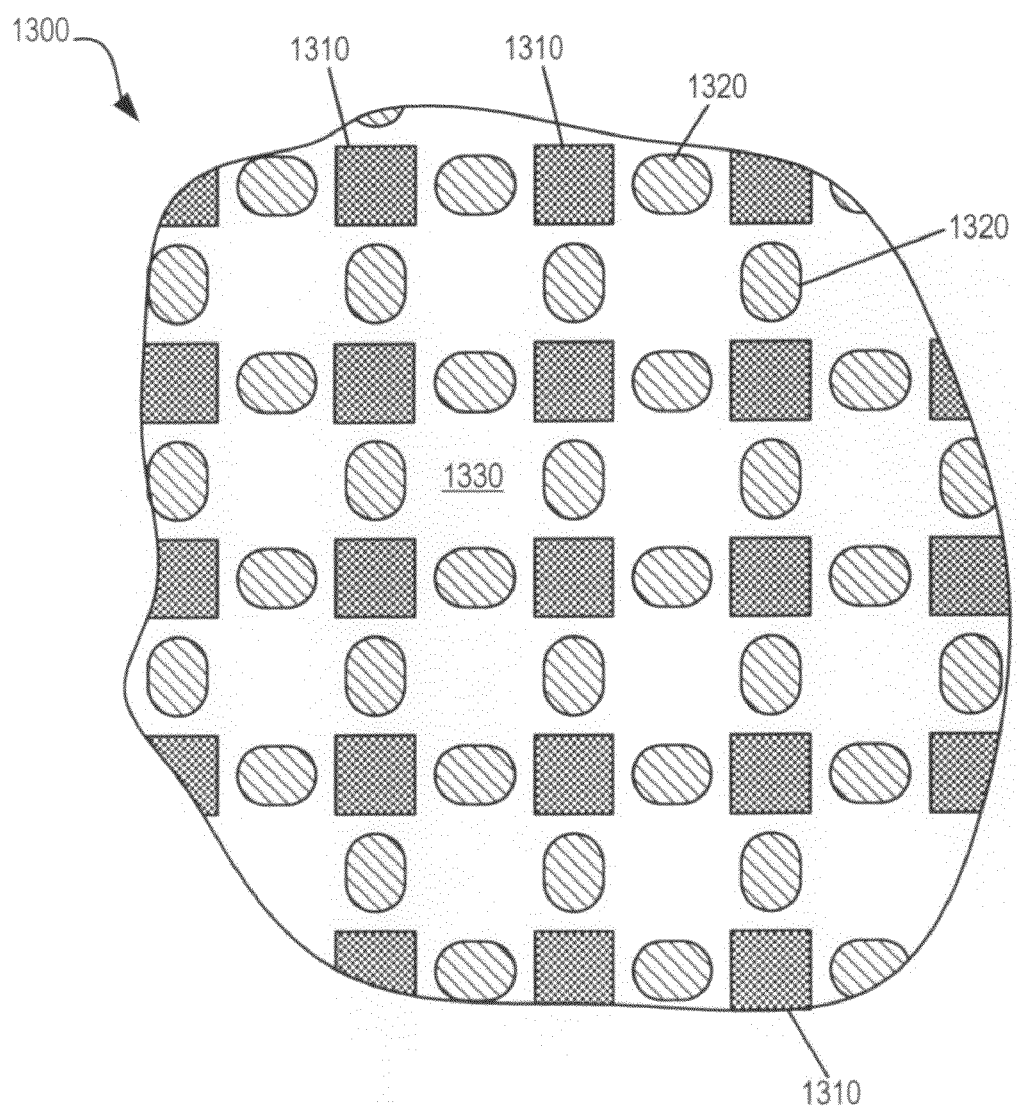
FIG. 13 is a plan view of a portion of transducer matrix film with extended elastic properties, in accordance with an embodiment.

FIG. 13 shows a plan view of a portion of transducer matrix film 1300 with extended elastic properties. Transducer matrix film 1300 may include one or more transduction cells 1310 and one or more transducer elements 1320 located on flexible substrate 1330. For illustrative clarity, not all transduction cells 1310 and transducer elements 1320 are labeled. Transducer elements 1320 may be sensing transducer elements such as strain gauges or thermocouples or actuating transducer elements such as thin film resistive heating elements.

The modulus of elasticity of transducer matrix film 1300 may be designed to vary within different regions of transducer matrix film 1300. For example, due to the presence of the elements of transduction cell 1310, such as described above in association with transduction cell 500 of FIG. 5; a modulus of elasticity of regions including transduction cells 1310 may be greater than a modulus of elasticity of regions including transducer elements 1320. Furthermore, a modulus of elasticity of regions of bare substrate 1330 may be less than that of regions including transducer elements 1320. Locating transducer elements 1320 directly on substrate 1330, rather than within transduction cells 1310 may minimize an area required by transduction cells 1310 whereby decreasing a net modulus of elasticity of transducer matrix film 1300. Furthermore, locating transducer elements 1320 directly on substrate 1330 may increase a range of operation for and/or a sensitivity of transducer elements 1320. Substrate 1330 may be formed of multiple layers and certain layers may of high modulus and others of low modulus materials. Regions of high modulus material may be etched, heat treated, thinned or otherwise modified to adjust modulus for different regions of transducer matrix film 1300. Alternatively, additional layers of high modulus material may be bonded or otherwise attached to adjust modulus for different regions of transducer matrix film 1300.

Although shown in FIG. 13 as a regular square array, transduction cells 1310 and transducer elements 1320 may be arranged in any other pattern as necessary or desired. Interconnects (not shown) including power, ground and signal may extend from transducer elements 1320 to transduction cells 1310. Connection points (not shown), such as described herein above, may be supplied on a surface of transducer matrix film 1300.

Transducer matrix film with extended elastic properties may be useful for application to or as articles including, but not limited to, clothing, footwear, bands, gloves, belts and/or medical appliances intended for humans or animals. Transducer matrix film 1300 may measure and record strain and/or temperature data as a human or animal moves. Alternatively or optionally, transducer matrix film 1300 may actuate visual or heating transducer elements.

FIGS. 14 and 15 show three dimensional views of humans 1400 and 1500 showing applications of transducer matrix film. As a body moves strain varies over the body surface and may be monitored by transducer matrix film. Transducer matrix film may be independently designed or integrated with a material such as elastane with a modulus which may allow full movement but may remain under stress while making the intended measurements.

Human 1400 may have multiple sections of transducer matrix film 1410, 1420 and 1430 positioned upon and formed to fit their body as a medical appliance to measure or actuate sensory data. Transducer matrix film 1410, formed as an arthroscopic elbow support, may be located proximate to elbow regions of the body to monitor elbow motion related to normal motion, performance study or rehabilitation from injury such as tendonitis. Additionally or optionally, transducer matrix film 1410 may actuate and supply heat or cool the elbow region. Transducer matrix film 1420, acting as a plethysmograph, may be located across a chest portion of human 1400 to monitor breathing or other chest motion of a distance runner or cyclist. Transducer film 1430, formed as an arthroscopic knee support, may be located proximate to one or more of the knees of human 1400 to monitor swelling and temperature following arthroscopic surgery. For these applications, transducer elements of transducer matrix film 1400 may include both strain and temperature sensing elements and/or actuating elements such as electrical contacts for electrostimulation.

Turning now to FIG. 15, human 1500 may wear a full garment 1510 made from or incorporating transducer matrix film. Garment 1510 may be designed to fit human 1500 by incorporating transducer matrix film as part of a elastane or neoprene garment such as an athletic bodysuit or diving wetsuit, respectively. As described above, all or any portion of transducer matrix film forming garment 1500 may be activated and used. Garment 1500 may include segmented transducer matrix film which may be localized (have origin cells) to regions such as shown in FIG. 14. From strain data measured by transducer matrix film, a 3D strain model of a contacted body portion may be derived. Such sensory data may be used to increase the fidelity of computer generated imagery ("CGI") for video game graphics or computer generated images for movies. Furthermore, such sensory data may be used for real-time interaction with and/or control of video games or other entertainment systems. For unrestricted movement or remote application, garment 1510 and/or transducer matrix films 1410, 1420 and 1430 may include portable external devices such as battery packs, data recorders and wireless data transmission. Furthermore, capabilities such as data transmission and storage may be provided by mobile smartphone systems or other mobile devices. Although shown in FIG. 15, as being worn by a human, garment 1510 may be designed and used for animals. A circular cell address coding scheme, such as shown and described in association with FIG. 2, may be advantageously applied to articles using TMF such as garment 1510. Garment 1510 may be address coded so that an origin code is approximately in the middle of the front of garment 1510. An origin cell for garment 1510 may be defined using an external device which could be placed proximate to the cell selected to become the origin and therefore encode the selected cell as such.

Figure 16:
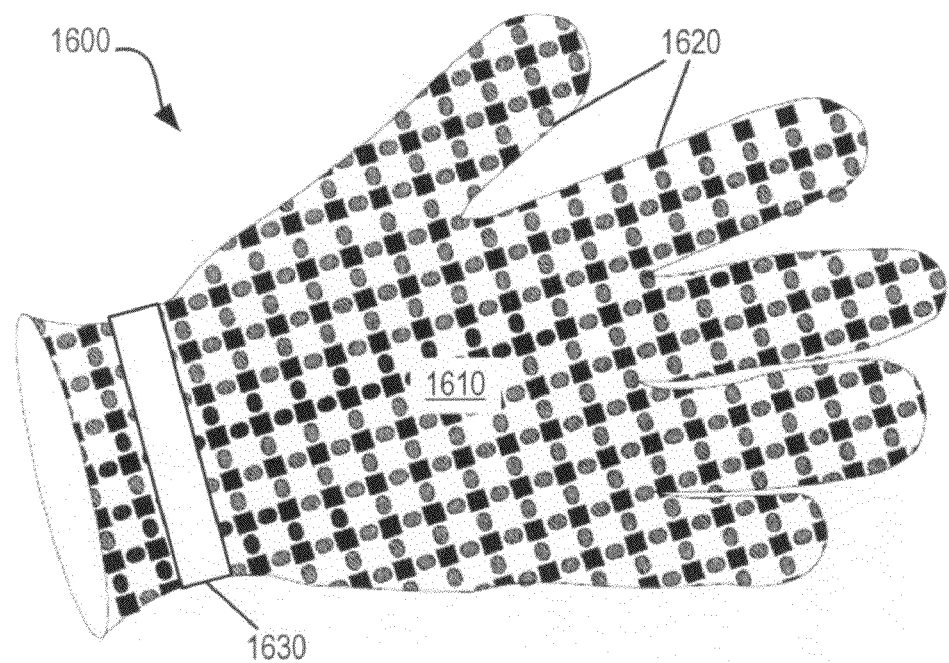
FIG. 16 is a three-dimensional view of an article fabricated from transducer matrix film, in accordance with an embodiment.

As an example of an article for sensory transduction, FIG. 16 shows a three dimensional view of glove 1600 fabricated from transducer matrix film 1610. Glove 1600 may be fabricated from transducer matrix film 1610 formed on a suitable substrate such as elastane or may be applied to a secondary substrate such as leather, nitrile rubber, latex, cloth or other textile. Optionally, transducer matrix film 1610 may be coated with a compliant material such as latex or rubber to protect transducer matrix film 1610 and to provide benefits of common gloves such as wear- or water-resistance. As described herein above, transduction cells of transducer matrix film 1610 may be designed to automatically cell address code. Seams typically located on the interdigital surfaces, such as interdigital surface 1620 between the thumb and index finger, of glove 1600 may permit cell address coding of the palm-side and dorsal surfaces of glove 1600 separately with origin cells defined independently for each finger.

Any combination of shapes of transduction cells and transducer elements may be used for glove 1600. For example, higher density (smaller sized) transduction cells and/or transducer elements may be formed within transducer matrix film 1610 in areas of glove 1600 near fingertips whereby providing greater sensitivity. Transducer matrix film 1610 may include transduction cells and/or transducer elements for sensing temperature and/or strain. Additionally or optionally, transducer matrix film 1610 may include transduction cells and/or transducer elements for actuating heat or electrical stimulation for muscle rehabilitation for hand injury.

Due to the design of transducer matrix film 1610, a minimum number of connections to external devices may be required; namely power, ground and signal. An external power pack and/or mobile computing device may be used to provide these connections. Alternatively, power and signal transfer may be designed into wristband 1630 including an embedded power pack, microprocessor and RF wireless communication to external devices such as a mobile phone. Transduction cells within transducer matrix film 1610 may be defined to provide a continuously variable output for induced strain or temperature or may be designed to produce a thresholding signal. For example, a glove designed for safety may include temperature sensing transducer elements and circuitry which signals when a temperature is above a safe value for a wearer.

Glove 1600 may also me used as flexible sensory "smart skin" for a prosthesis or robotic element such as a cybernetic hand permitting imaging of force distributions for robotic gripping applications. In another example, a prosthesis may include transducer matrix film as part of its external surfaces for providing a simulated sensor of touch or contact. For example, an artificial foot may be covered by transducer matrix film providing sensory data about gait, foot pressure and other information to effect or improve rehabilitation.

Figure 17:
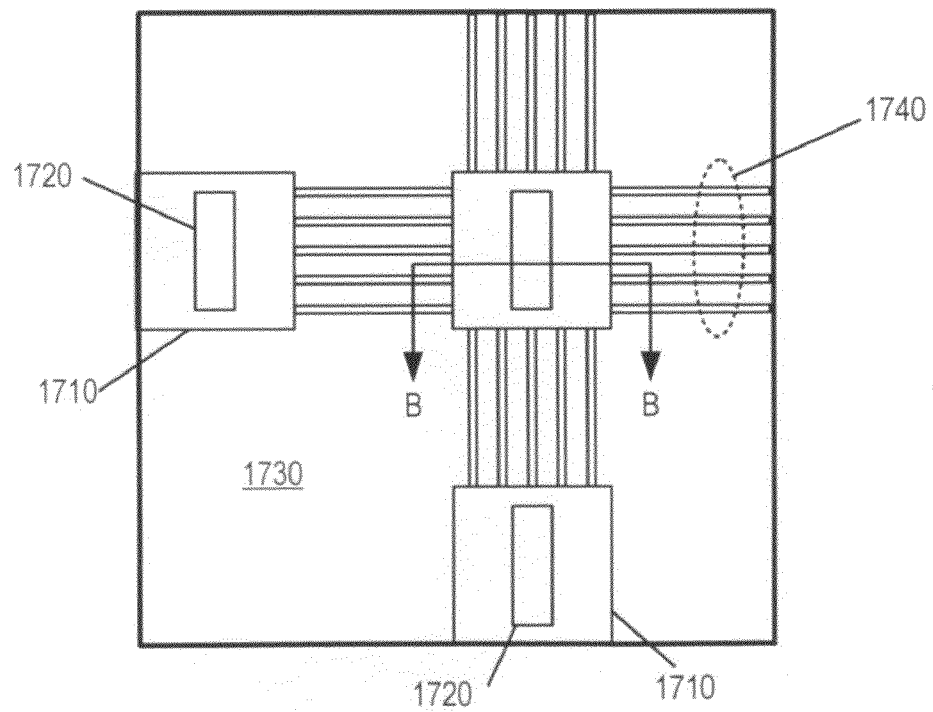
FIG. 17 is a plan view of a portion of transducer matrix film from the article of FIG. 16, in accordance with an embodiment.

FIG. 17 shows an enlarged plan view of a portion of transducer matrix film 1610 from glove 1600 of FIG. 16. Transducer matrix film 1610 may include any number of transduction cells 1710 arranged in a regular square array as shown in FIG. 17 or in other geometries as described herein. Transduction cells 1710 may additionally or optionally include raised features 1720 which are described herein below in association with FIGS. 18 and 19. Interconnections 1740 may be located within or upon a surface of substrate 1730. Substrate 1730 is not required to be a continuous material but may be woven materials such as textiles, non-woven materials such as felts or banded/open materials such as meshes as long as regions of the substrate are provided for locating transduction cells 1710 and interconnections 1740. Additionally or optionally, transducer elements (not shown) may be formed on regions of substrate 1730 not occupied by transduction cells 1710 and/or interconnections 1740.

Figure 18:
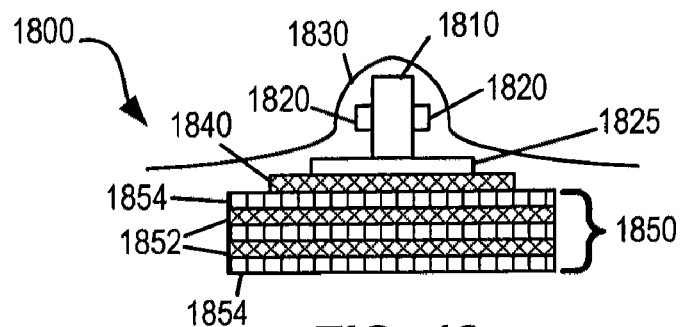
FIGS. 18 and 19 are cross-sectional views of the portion of transducer matrix film of FIG. 17 along section line B-B showing alternate construction details of the transducer matrix film, in accordance with an embodiment.
Figure 19:
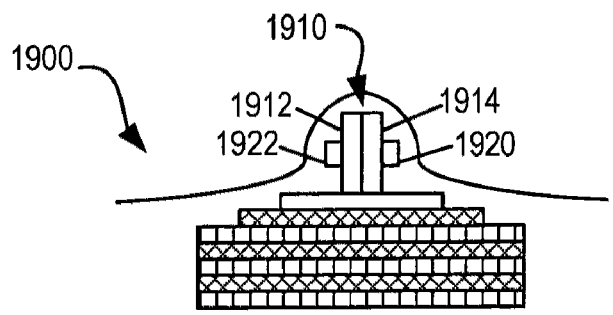

FIGS. 18 and 19 show enlarged alternate construction cross-sectional views of the portion of transducer matrix film shown in FIG. 17 along section line B-B showing further details. Transduction cell section 1800 includes a raised feature 1810 which may be contacted by one or more transducer elements 1820 and 1825. Raised feature 1810 may be a "bump" or a "ridge" depending upon the spatial extend of feature 1810. A "ridge" shaped form of raised feature 1810 may approximate transducing capabilities of a fingerprint ridge. Transducer elements 1820 and 1825 may be strain or temperature elements such as described herein. Raised feature 1810 and transducer elements 1820 and 1825 may be covered by or encapsulated within a flexible dielectric material 1830 that provides sensory transport (e.g., suitably flexible with a sufficiently large heat transfer coefficient) while providing electrical isolation for any elements of transduction cell section 1800. Transducer elements 1820 and 1825 may be configured to be sensitive to lateral and normal application of force/pressure and measure the corresponding resultant strain. Alternatively, transducer elements 1820 and 1825 may be actuated to supply lateral and/or normal forces. Furthermore, transducer elements 1820 may be actuated to provide lateral forces while transducer element 1825 is actuated to provide an increase in temperature.

Transduction cell section 1800 further includes elements 1840, such as elements described above in association with FIG. 5, which may be formed upon a section of semiconductor material such as silicon. Transduction cell section 1800 may be mounted upon a layered substrate 1850. Layered substrate 1850 may include any number of layers such as conducting layers 1852 providing signal and power paths as well as dielectric layers 1854 providing isolation for any conducting layers. Alternatively, layered substrate 1850 may be replaced with a single layer with conducting traces patterned onto one or more surfaces or encapsulated therein.

Transduction cell section 1900 may include an additional variation from transduction cell section 1800. Raised feature 1910 of transduction cell section 1900 may be divided in a plurality of vertically oriented layers 1912 and 1914 so forming a multi-layer structure which provides response to lateral strains or temperature. For example, if raised feature 1910 includes only two layers 1912 and 1914 which are formed from materials of different coefficients of thermal expansion ("CTE"); raised feature 1910 may sense temperature from the resultant induced strain difference between transducer elements 1920 and 1922. For example, when the CTE of layer 1912 is greater then the CTE of layer 1914, raised feature 1910 will flex toward the right of FIG. 19. The resultant thermally induced strain may be in addition to any strain induced by application of normal or lateral forces to raised feature 1910.

Figure 20:
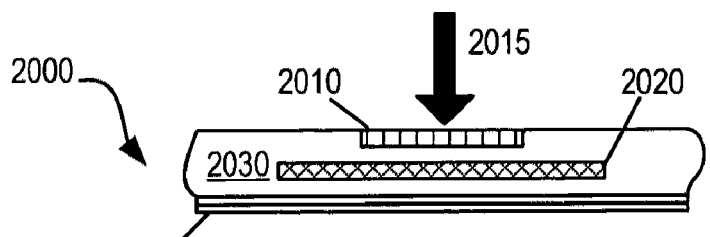
FIGS. 20 and 21 are cross-sectional views of a portion of transducer matrix film showing alternate construction details of transducer matrix film, in accordance with an embodiment.
Figure 21:
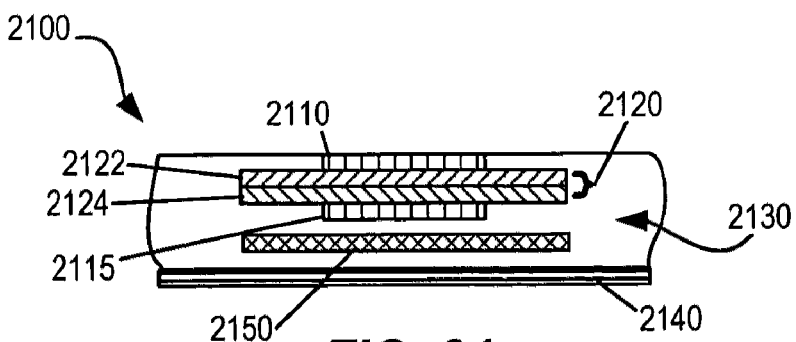

FIGS. 20 and 21 show cross-sectional views of a portion of transducer matrix film showing alternate construction of transducer matrix film. Transduction cell sections 2000 and 2100 do not include raised features which may be included in the transduction cell sections of FIGS. 18 and 19. Transduction cell section 2000 may include a transducer element 2010 which may sense temperature or applied strain 2015 normal to the surface (indicated by black arrow). Transduction cell section 2000 may also include elements 2020, such as elements described above in association with FIG. 5, which may be formed upon a section of semiconductor material such as silicon. Transduction cell section 2000 may be encapsulated with dielectric material 2030 and located upon substrate 2040.

Transduction cell section 2100 is an alternate construction to transduction cell section 2000. Transduction cell section 2100 may include transducer elements 2110 and 2115 located proximate to a material bilayer 2120 which provides response to normal strains or temperature. For example, if layers 2122 and 2124 of bilayer 2120 are formed from materials of different coefficients of thermal expansion ("CTE"); bilayer 2120 may sense temperature from the resultant induced strain difference between transducer elements 2110 and 2115. For example, when the CTE of layer 2122 is greater then the CTE of layer 2124 bilayer 2120 may deform (concave-down) toward substrate 2140. Optionally transducer elements 2110 and 2115 may be actuated to provide displacement. Transduction cell section 2100 may be encapsulated with dielectric material 2130 and located upon substrate 2140. Elements 2150, such as elements described above in association with FIG. 5, may be formed upon a section of semiconductor material such as silicon.

Figure 22:
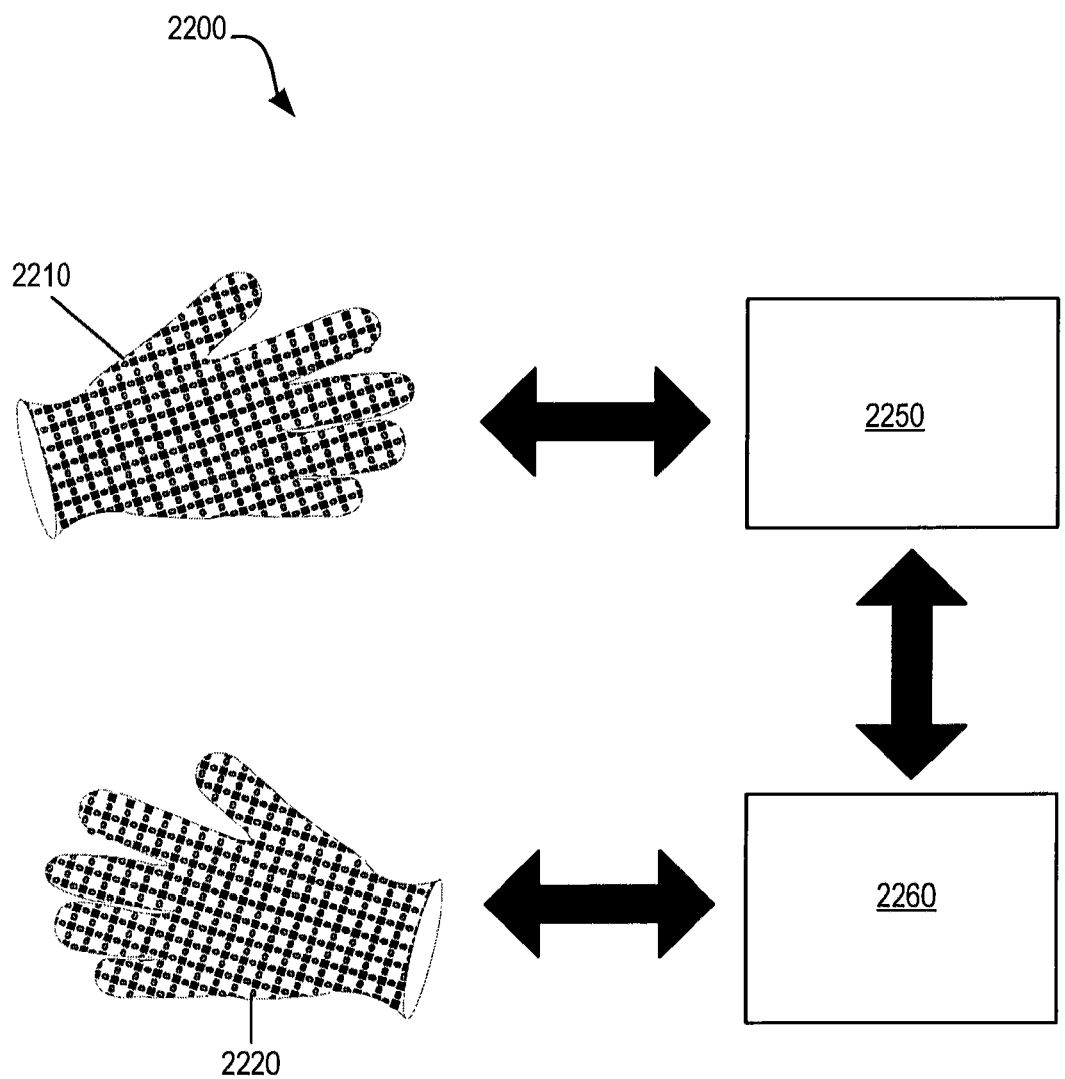
FIG. 22 is a block diagram of a system for sensory communication, in accordance with an embodiment.

FIG. 22 shows a block diagram of system 2200 for sensory communication. Although shown in FIG. 22 as including two input/output devices 2210 and 2220, system 2200 may include any number of input/output devices utilizing transducer matrix film for sending (measuring) and/or receiving (actuating) sensory data. Sensory data may include force, mechanical pressure, acoustic pressure, stress, strain, temperature, chemical activity, light intensity, electrical signal values and other sensory information. Input/output devices 2210 and 2220 may be unidirectional (send or receive only) or bidirectional (send and receive). Devices 2210 and 2220 may be constructed such as glove 1600 of FIG. 16 for sensory communication between two humans or between one human and a robotic device. In another example, device 2210 may be transducer matrix film 1430 of FIG. 14 or garment 1510 of FIG. 15 and device 2220 may be glove 1600 worn be a medical practitioner for use as part of a telemedical application permitting palpation of a patient's knee. Used as an input/output device, transducer matrix film may be associated with any living or inanimate object and may be fixed to or embedded within any appropriate surface or volume.

For each input/output device 2210 and 2220, system 2200 may include external devices 2250 and 2260, respectively for communication and power support. External devices 2250 and 2260 may be, for example, internet connected devices such as laptop computers or wireless networked devices such as mobile phones. External devices 2250 and 2260 may include wired or wireless communication devices and capabilities such as ZigBee, WiFi, RS232 and/or Bluetooth. External devices 2250 and 2260 may provide power support in the form of batteries, photovoltaic elements, capacitive storage, wireless RF power transmission or wired power sources. Each external device 2250 and 2260 may communicate with each other or with each input/output device 2210 and 2220 by wired or wireless capabilities.

Although transducer matrix film may be directly used in a sensory communication system such as system 2200; transducer matrix film may be used in association with a secondary system, actuator or device, responsive to the transducer matrix film that amplifies or modifies the sensory data provided by or received by the transducer matrix film. In the telemedical palpation example discussed herein above a medical practitioner may wear input/output device 2220 in the form of glove 1600 to palpate a deformable facsimile of a human knee. Input/output device 2220 may directly measure forces applied to the facsimile by the medical practitioner.

Additionally or optionally, sensory feedback may be applied between the facsimile and device 2220 which may further incorporate data from device 2210 such as temperature data.

Since transducer matrix film in the form of a medical appliance such as shown by transducer matrix film 1430 of FIG. 14 may not be able to actuate the same forces as are provided by the medical practitioner; device 2210 may be utilized as part of a feedback system for a mechanical device or second person for actuating the forces equivalent to those effected by the practitioner. For example, device 2210 may include a transducer element such as an LED for visual indication that signals a human operator to apply less or greater force. The led may be lit when the applied force is within a specified range or percentage error of the force applied by the practitioner.

If used with a mechanical actuator instead of a human actuator, transducer matrix film used with device 2210 may include additional features, such as electrical contact points, permitting communication to external devices. For example, force actuation for the palpation may be supplied by a electromechanical or pneumatic device designed like a "bed-of-nails" which includes a number of small independent force actuators. Electrical contact points on transducer matrix film may mate with contact points on the device permitting signals received by the transducer matrix film to actuate the device. Additionally, signals for driving actuators of a device may be conditioned and processed by the transducer matrix film. In a further example, force actuation for the palpation may be supplied by a robotic hand which simulates or exceeds the dimensions and strength of a human hand, enclosed by glove 1600 of FIG. 16. Examples of actuators which may be used with the robotic hand and transducer matrix film as components of an actuation system may include pneumatic cylinders or bladders; hydraulic cylinders or bladders, linear or rotational electric actuators and/or electroactive polymer actuators. Such actuators may be attached to articulated digits or other points of motion of the robotic hand via linkages or other simple mechanical means to amplify the forces conveyed from transducer matrix film to the surface under palpation.

Input/output devices 2210 and 2220 made from transducer matrix film may have any combination of sensing and actuating transducer elements. Actuators designed into transducer matrix film may include piezoelectric, polymer, resistive, memory metal, electroactive polymer actuators or other types which actuate when a signal is applied to change shape, expand, contract, heat and/or cool. An actuating transducer element may be mechanically designed to amplify applied movement, enhance measurement, or provide feedback capabilities. For example, glove 1600 of FIG. 6, may include a bilayer structure of sensing transducer matrix film and an actuating transducer matrix film. The sensing transducer matrix layer may contact a human hand and the actuating transducer matrix film may be contacting any object. Although described above with respect to a palpation example, it should be understood that system 2200 may be used for other sensory communication which conveys sensory data such as for application of force to any object.

Figure 23:
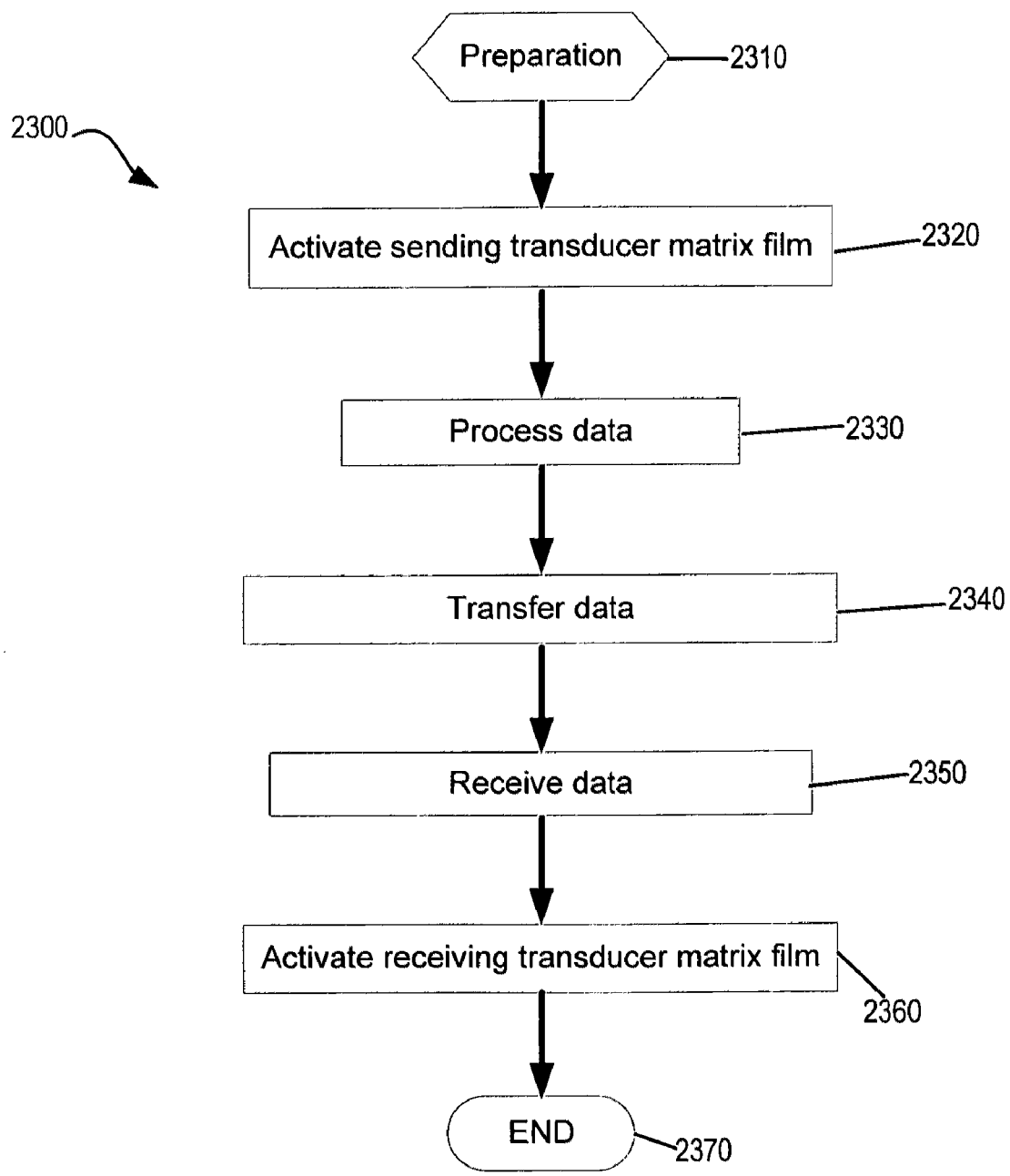
FIG. 23 is a flow chart of a process for sensory communication, in accordance with an embodiment.

FIG. 23 shows a flow chart of process 2300 for sensory communication. Process 2300 starts with step 2310 wherein any necessary or optional setup and preparation steps may be performed. Setup and preparation operations may include preparation of transducer matrix film as described herein and/or any required initial setup of communications or signal processing. Process 2300 next advances to step 2320 wherein a sending transducer matrix film is activated. A sending transducer matrix film, such as glove 1600 of FIG. 6 may be activated by triggering as described herein above or optionally may be in a constant state of periodic or aperiodic measurement. Once measurements have been taken and/or recorded, process 2300 advances to step 2330 wherein data measured by the transducer matrix film is processed. Data processing, such as signal averaging of multiple measurements, may be internal to transducer matrix film and effected by an element such as processor 570 of FIG. 5 or may be effected by an external device such as a mobile phone.

Process 2300 next advances to step 2340 wherein processed data is transferred. Data may be transferred by methods and systems, such as internet wireless or wired communications or others such as described herein. Process 2300 next advances to step 2350 wherein transferred data is received and processed for use by a receiving transducer matrix film such as incorporated in input/output devices 2210 and 2220 of FIG. 22. Process 2300 next advances to step 2360 wherein the receiving transducer matrix film is actuated based upon the received data. The receiving transducer matrix film may be self-actuated upon receipt of data or may require triggering from an external device or by an operator. After data has been received and processed, process 2300 terminates at step 2370. Process 2300 may transfer measurement data in real-time or may provide for temporary or permanent storage of data.

Instrumentation of sports equipment using transducer matrix films may provide sensory information which may be used for sport entertainment, interaction, replay, officiating, player training, player performance evaluation, computer graphics imagery ("CGI") or informative purposes. Although specific example of sports and related equipment are represented below, it should be understood that the systems and methods discussed herein may be applied, with suitable adaptation, to other sports and/or related equipment. For example, certain examples herein discuss applications to basketball and baseball and it should be understood that the systems and methods may be applied to American football, soccer, softball, volleyball, cricket and other sports and related equipment. It should also be noted that, in general, transducer matrix film may be permanently or removeably affixed or integrated with any article of sports equipment. The following descriptions of articles of instrumented sports equipment may, in general, include either/both unmodified articles modified by the association with transducer matrix film or articles with integrated transducer matrix film.

Figure 24:
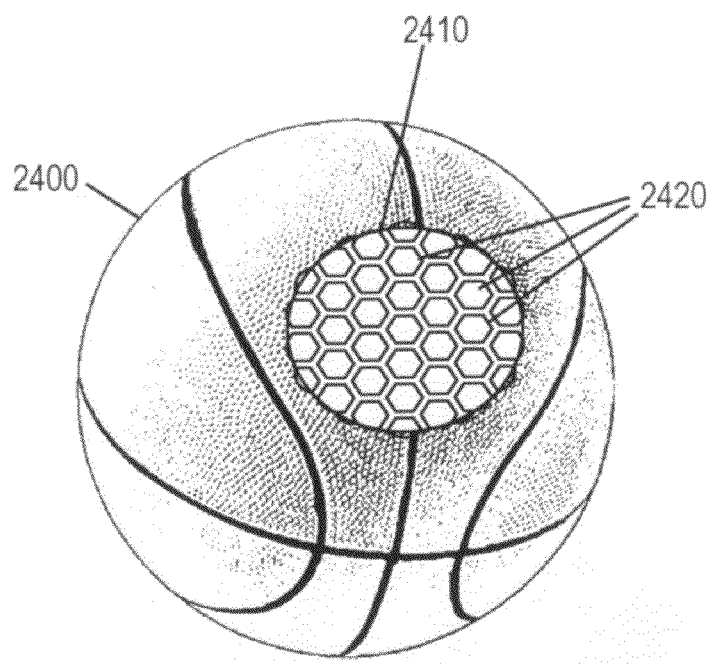
FIG. 24 is a three-dimensional view of a basketball including transducer matrix film, in accordance with an embodiment.

FIG. 24 shows a three-dimensional view of basketball 2400 including transducer matrix film 2410 which further includes a plurality of hexagonally organized transduction cells 2420. It should be noted that for illustrative clarity, not all transduction cells 2420 are labeled in FIG. 24. As shown, transducer matrix film 2410 may be formed on an interior surface of basketball 2400. Transducer matrix film 2410 may be bonded or otherwise affixed to an interior surface of basketball 2400. Alternatively, transducer matrix film 2410 may be formed within a wall of basketball 2400 during casting or molding of the polymer material from which basketball 2400 is manufactured. Transducer matrix film 2410 may include any number of transduction cells 2420 of any geometry as discussed herein above. Transduction cells 2420 which are configured for stress, strain and/or temperature sensing may permit monitoring of sport activity such as dribbling forces, hand-to-basketball interactions, ball temperature and contact forces. For example, an instrumented basketball may permit determination of contact or lack thereof prior to a basketball going out of bounds for officiating purposes. Transducer matrix film 2410 may be powered via batteries, internal or external photovoltaic devices, RF energy, supercapacitors or any other method discussed herein.

Figure 25:
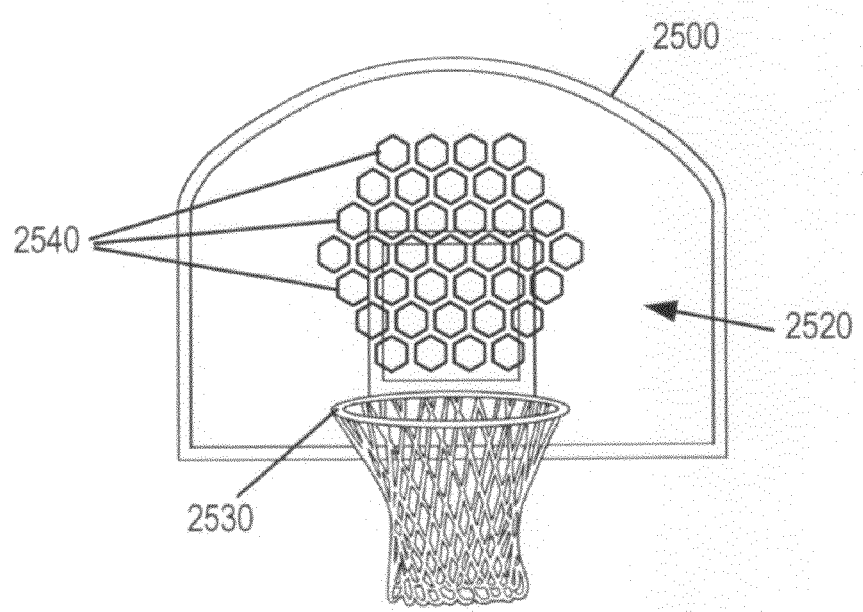
FIG. 25 is a front view of a basketball backboard including transducer matrix film, in accordance with an embodiment.

FIG. 25 shows a front view of basketball backboard 2500 including transducer matrix film with transduction cells 2540. Transduction cells 2540 may be applied to or formed upon the generally planar surface 2520 of backboard 2500. Transduction cells 2540 may be positioned over any or all portions of surface 2520 and may be of any geometry. Transducer matrix film (not shown) may also be applied to portions of basketball rim 2530. Transducer matrix film and transduction cells 2540 may be employed to determine points of contact for a thrown basketball. For example, a player throws basketball 2400 which contacts backboard 2500 and then rim 2530; ultimately scoring a three-point shot. Transducer matrix film applied to basketball 2400, backboard 2520 and rim 2530 may permit the determination of release force, orientation, spin and other factors applied to basketball 2400. Monitoring of these and other factors may allow determination of causes for a successful or unsuccessful shot. Monitoring of these factors may also permit player training and evaluation, interactive replay and/or other sports-entertainment use of the sensed data.

Figure 26:
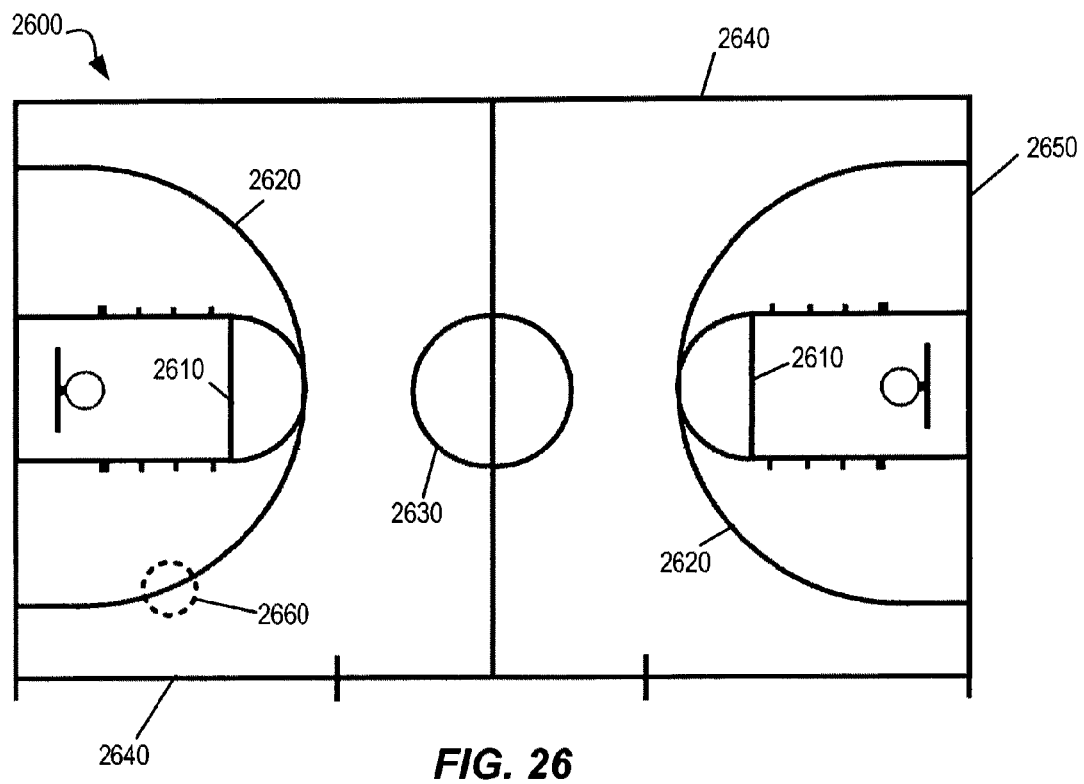
FIG. 26 is a plan view of a basketball court including transducer matrix film, in accordance with an embodiment.
Figure 27:
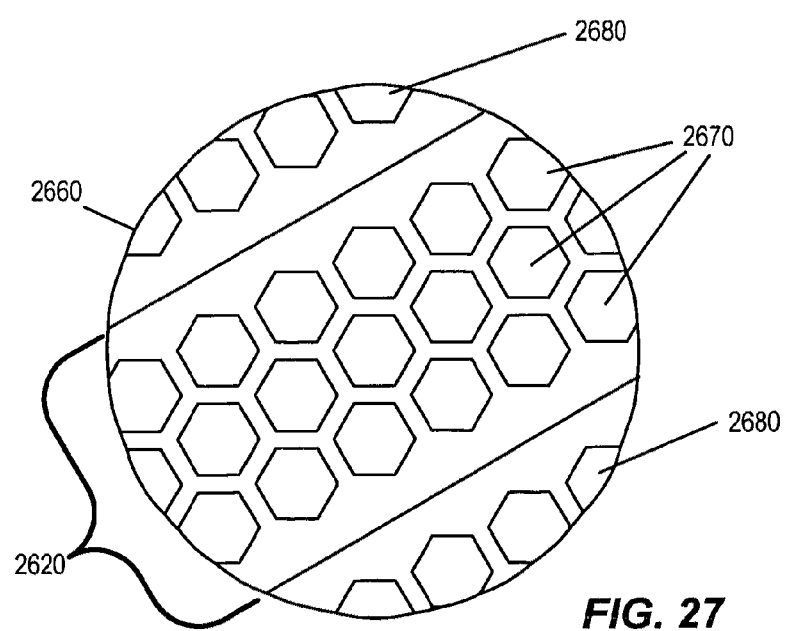
FIG. 27 is an enlarged view of a portion of the basketball court of FIG. 26 showing details of a modified three-point line including transducer matrix film, in accordance with an embodiment.

In addition to the abovementioned basketball equipment; FIG. 26 shows a plan view of basketball court 2600. Basketball court 2600 is generally defined by a collection of markers applied to the planar court surface. All portions of basketball court 2600 may be instrumented with transducer matrix film. Specific markers which may include transducer matrix film include free-throw lines 2610, three-point lines 2620, center circle 2630, sidelines 2640 and endlines 2650. FIG. 27 shows an enlarged view of portion 2660 of the basketball court 2600 of FIG. 26 showing details of modified three-point line 2620 including transducer matrix film. Regions of basketball court 2600 within as well as outside of three-point line 2620 may be instrumented with transduction cells 2670 and 2680 respectively. Transduction cells 2670 and 2680 sensing pressure may be used to determine if a three-point shot was in effect a true three-point shot by sensing the presence of a players foot within, upon or external to three-point line 2620.

Figure 28:
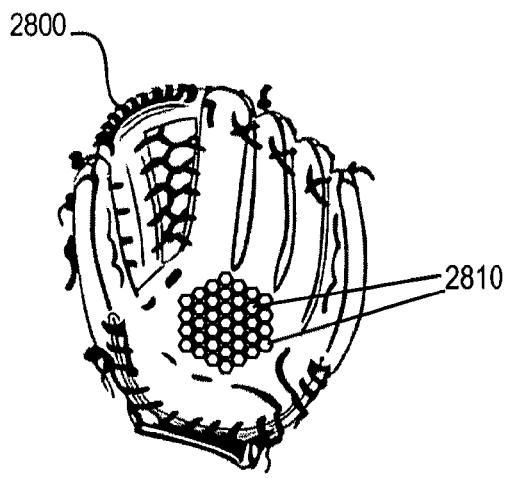
FIG. 28 is a three-dimensional view of a baseball glove including transducer matrix film, in accordance with an embodiment.

Another sport that may be instrumented using transducer matrix film is baseball. FIG. 28 shows a three dimensional view of baseball glove 2800 including transducer matrix film 2810. Instrumented with transducer matrix film 2810, baseball glove 2800 may be used for sports training or interaction purposes. For training, transducer matrix film 2810 may sense stress or strain and determine the location within glove 2800 where a baseball has been caught. This information, for example, may permit a player to understand the dynamics of their catching style and their perception of the ball to glove relative position and therefore permit a player to better catch balls. For sports-entertainment purposes, the sensing for training may be augmented via determination of a speed of a baseball at time of capture. This information may then be presented to a baseball fan. Glove 2800 may include a battery pack for powering transducer matrix film 2810 and RF communications for transmitting signals to/from transducer matrix film 2810. Time of flight of a baseball may also be determined by use of an instrumented bat 2900 as shown in FIG. 29 and/or instrumented baseball 3000 as shown in FIG. 30.

Figure 29:
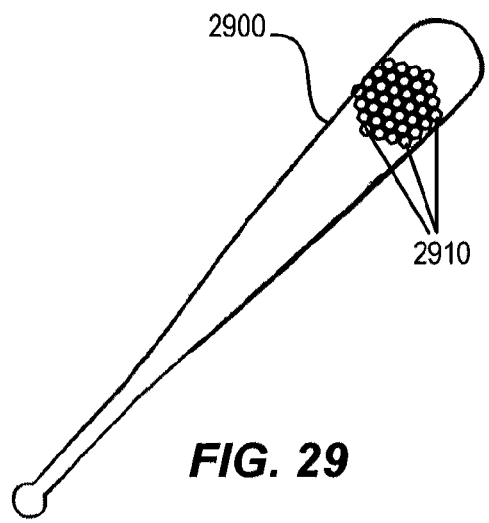
FIG. 29 is a three-dimensional view of a baseball bat including transducer matrix film, in accordance with an embodiment.
Figure 30:
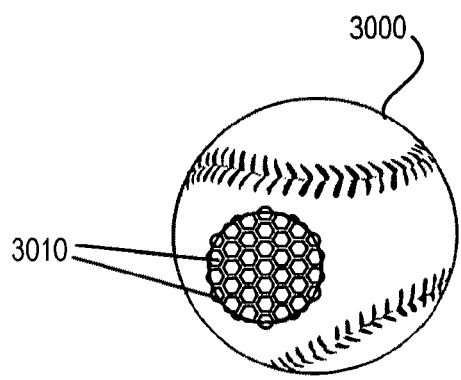
FIG. 30 is a three-dimensional view of a baseball including transducer matrix film, in accordance with an embodiment.

FIG. 29 shows a three dimensional view of baseball bat 2900 instrumented using transducer matrix film 2910. FIG. 30 shows a three dimensional view of baseball 3000 instrumented using transducer matrix film 3010. Baseball bat 2900 and baseball 3000 may include transducer matrix film for sensing stress, strain, pressure and/or temperature. Contact forces between baseball 3000 and baseball bat 2900 may be used to determine hitter swing forces for training, replay, entertainment or CGI use. Transducer matrix film 2910 may be bonded to a surface of bat 2900 or may be applied as a form-fitting sleeve. Transducer matrix film 3010 may be positioned under the outer covering of baseball 3000. Alternatively transducer matrix film 3010 may be applied to the exterior surface of baseball 3000. Large impact forces between baseball 3000 and bat 2900 may damage transduction cells of transducer matrix film positioned on the exterior surfaces of such objects, however; the cellular form of transducer matrix film permits failure of any cell without disabling operation of the entire film.

FIG. 31 shows a plan view of a baseball diamond 3100 instrumented using transducer matrix film. Baseball diamond 3100 includes a plurality of markers and objects which may be instrumented with transducer matrix film. For example, bases 3110, home plate 3120, pitcher's mound 3130 and foul lines 3140 may be instrumented with transducer matrix film to determine factors involved in a baseball game. Exemplary factors include, pitcher's feet position, foul/fair ball determination and safe/out base play.

FIG. 32 shows an enlarged view of a portion 3150 of baseball diamond 3100 of FIG. 31 showing details of modified foul line 3140 including transducer matrix film. Regions of baseball diamond 3100 within, upon as well as outside of the foul lines 3140 may be instrumented with transduction cells 3170, 3160 and 3180 respectively. Transduction cells 3160, 3170 and 3180 sensing pressure may be used to determine if a hit baseball was in effect a fair or foul ball as well as provide direction of flight and other information. Base contact and timing for determining if a player is actually out or safe may be determined by instrumentation of baseball base 3110 as shown in FIG. 33. Transducer matrix film 3190 may be applied or formed with any or all portions of baseball base 3110. For example, transducer matrix film may be applied to an inner surface of a base cover.

Figure 34:
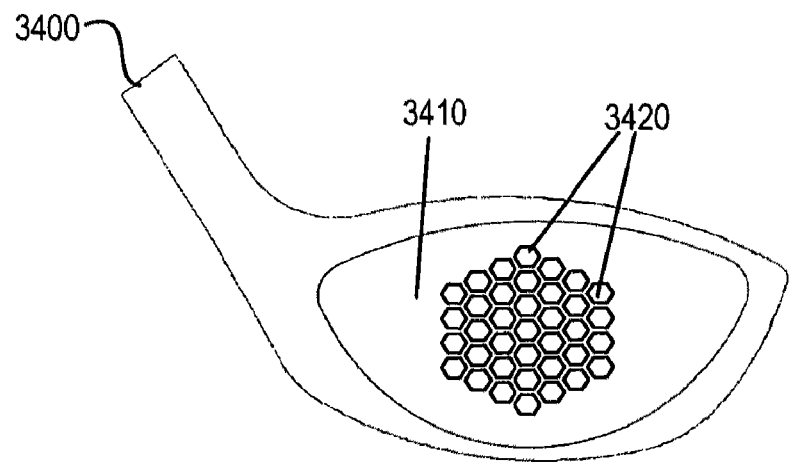
FIG. 34 is a front view of a portion of a golf club including transducer matrix film, in accordance with an embodiment.

FIG. 34 shows a front view of a portion of golf club 3400 including transducer matrix film. Contact face 3410 of golf club 3400 may include transducer matrix film 3420 for determination of club-ball contact forces and contact location. Contact location and forces may be used for training and/or interaction purposes. For example, using data supplied from transducer matrix film; when a professional golfer hits a slice, a sports commentator may be able to note that the ball and club contact was not centered. With suitable adaptation transducer matrix film may be applied to cricket bats or polo mallets.

Figure 35:
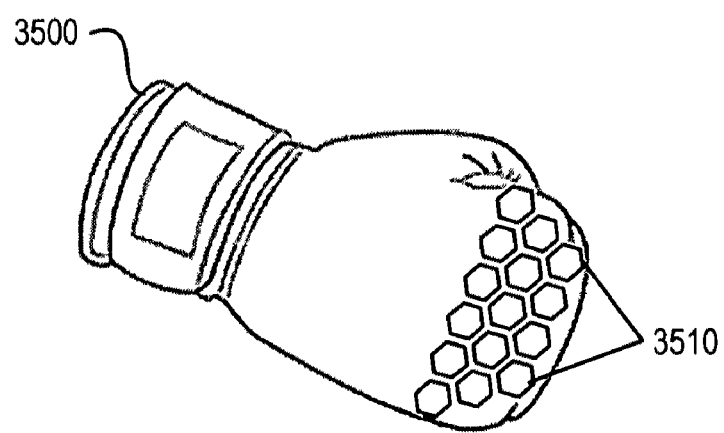
FIG. 35 is a three-dimensional view of a boxing glove including transducer matrix film, in accordance with an embodiment.

FIG. 35 shows a three dimensional view of boxing glove 3500 including transducer matrix film 3510. In international competition, points are scored base on hits; transducer matrix film 3510 may permit localization of hits as well as other hit parameters such as force and force distribution whereby removing subjectivity in scoring. Relatedly, protective gear used by a hockey goalie may include transducer matrix film and permit monitoring of puck impacts to add an additional dimension for sports-entertainment purposes.

Figure 36:
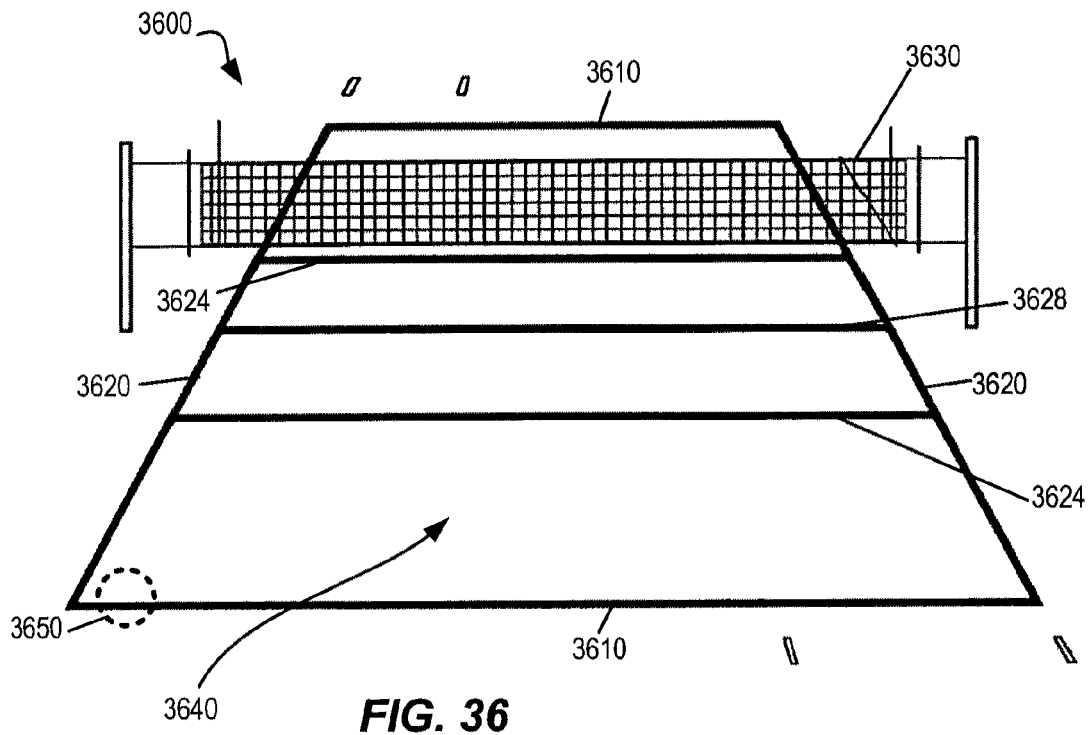
FIG. 36 is a perspective view of a volleyball court including transducer matrix film, in accordance with an embodiment.
Figure 37:
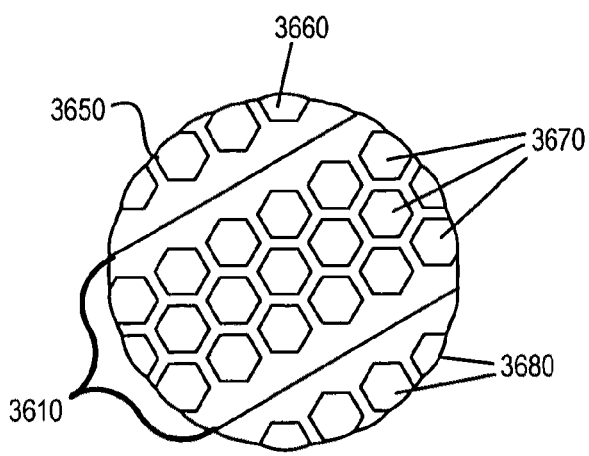
FIG. 37 is an enlarged view of a portion of the volleyball court of FIG. 36 showing details of a modified endline including transducer matrix film, in accordance with an embodiment.

FIG. 36 shows a perspective view of volleyball court 3600 instrumented using transducer matrix film. Volleyball court 3600 includes a plurality of markers and features, such as endlines 3610, sidelines 3620, 10-foot lines 3624, center line 3628, net 3630 and court surface 3640, which may be instrumented with transducer matrix film. FIG. 37 shows an enlarged view of portion 3650 of volleyball court 3600 of FIG. 36 showing details of modified endline 3610 including transducer matrix film. Regions of volleyball court 3600 within, upon as well as outside of the endline 3610 may be instrumented with transduction cells 3660, 3670 and 3680 respectively. Transduction cells 3660, 3670 and 3680 sensing pressure may be used to determine a foot fault during serving or if a volleyball is in bounds or out of bounds.

As described above in association with multiple embodiments, transducer matrix film, when integrated with or placed upon a floor or other surface, may be used to detect/analyze position, trajectory or presence of one or more items (objects, vehicles, people, animals, packages, etc.) by sensing pressure or other sensory information such as temperature. The detection of position, presence, gait, stance, weigh distribution or other parameters may be used, for example, for navigational purposes of a person within a building or for security purposes by determining weigh, stance or gait of a person being monitored.

Transducer matrix film coupled with gait recognition analysis may use a monitored person's weight, footfall patterns, stride length and foot impact pressures to differentiate one person from another. In contrast to video security systems using facial recognition where obscuration is a significant issue, the use of transducer matrix film, object tracking algorithms and gait analysis limits obscuration since at any time each monitored person can be distinguished since two people cannot walk/stand in the same place at the same time. The integration of transducer matrix film with floors throughout an entire building may permit tracking of a person within the entire building. A person may use the tracking data to locate/navigate himself within the building or others may use the tracking data to monitor the tracked person. This data may be used for security purposes, traffic flow analysis, workplace time studies and the like. Integrated into floors, flooring and floor coverings in residential structures, transducer matrix film may record movement of animals or children in the structure. For example, integrated proximate a swimming pool in a pool deck, transducer matrix film by sensing weigh or short gait may provide an alarm if a child approached the pool. Optionally, transducer matrix film may be integrated with other surfaces such as walls, roadways, doors, etc. to provide security, tracking, vehicle weight, vehicle counts, and other functions. Herein the term "integrated with" may be understood as conveying any possible type of association including integrally formed with, affixed to, attached to, placed upon, etc.

Figure 38:
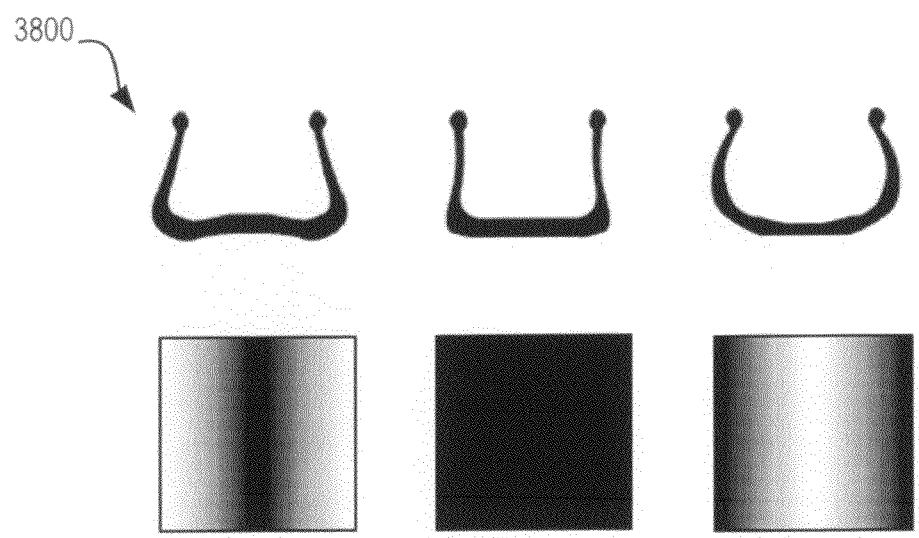
FIG. 38 is a series of cross-sectional views and simulated contact patches of tires including transducer matrix film, in accordance with an embodiment.
Figure 39:
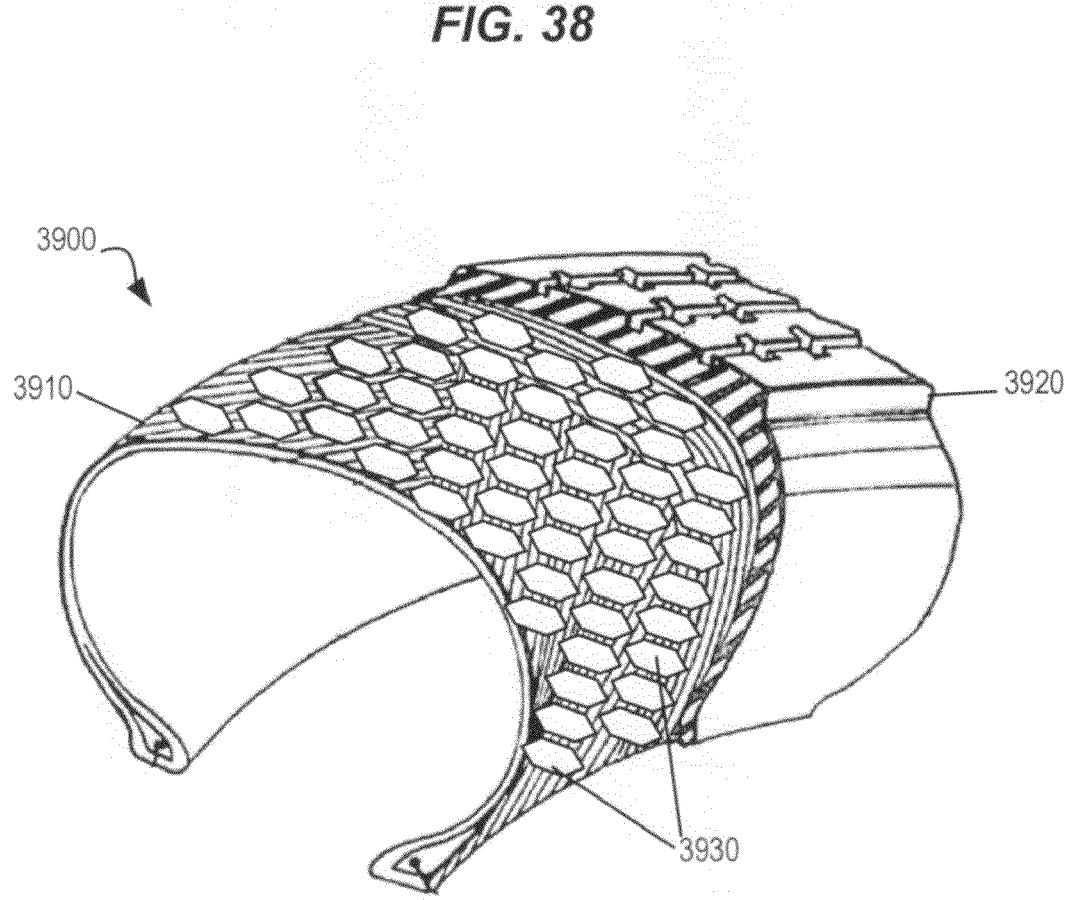
FIG. 39 is a partial cut-away three-dimensional view of a tire including transducer matrix film, in accordance with an embodiment.

Proper tire inflation is required for safe operation of a motor vehicle as well as for maintaining lifetime of tires. FIG. 38 shows a series of cross-sectional views and simulated contact patches of tires instrumented using transducer matrix film to provide sensory information relating to functional parameters of said tire. From left to right in FIG. 38 are shown an underinflated tire, a properly inflated tire and an overinflated tire. FIG. 39 shows a partial cut-away three-dimensional view of tire 3900 including transducer matrix film 3930. Transducer matrix film 3930 may be formed as a layer of tire 3900 between one or more layers of belting 3910 and an outer tread portion 3920. Transducer matrix film 3930 may provide sensor information related to tire functional parameters such as pressure, tread and/or sidewall deflection, stresses/strains and other sensory information such as tire temperature. Other functional parameters such as localized measurement of deflection and/or deformation rather than general tire air pressure information may provide data related to local failure modes of tire 3900 such as cord separation, cord failure or punctures. Transducer matrix film 3930 may also be used to monitor proper tire inflation whereby reducing fuel consumption and tire wear. A pressure map of forces affecting a tire may be used for tire testing and evaluation purposes or as part of a safety or performance feedback system. For example, tires on a tractor-trailer vehicle may be instrumented with pressure and temperature sensing transducer matrix film to provide warnings of tire failure prior to catastrophic failure which may result in an accident or considerably property damage. As part of a performance system, tires on racecars may be instrumented with pressure and temperature sensing transducer matrix films and provide tire wear, temperature and other information which may be employed by a pit crew to signal a driver for tire changes.

TMF incorporated with a vehicle tire may also provide critical feedback to determine a wheel alignment of the vehicle. Data provided by TMF-equipped vehicle tires may provide components of a control system that adjusts the alignment of a vehicle during operation or the data may be recorded to be used during vehicle servicing and wheel alignment. In this way, real-world data collected during actual vehicle operation may be used for alignment in place of or in addition to current technologies that either simulate conditions or use static measurements of suspension components. Proper alignment may reduce fuel consumption, tire wear and other factors.

For example, TMF incorporated with a vehicle tire may measure pressure in any/all directions and/or strain laterally on the tire's surface. For a vehicle's tire that is improperly aligned so that it will wear the inside edge of the tire; a differential wear pattern may take time/miles (weeks/1000's of miles) to become evident and by that time, damage caused by the improper alignment has already occurred. Pressure/strain data from the TMF may be analyzed over a very short period of time (seconds/a few tire revolutions) to show the higher pressure on the inside edge of the tire and/or the lateral deflections of the tire caused by the improper alignment. This will enable a vehicle owner/user or automated/active vehicle system to correct/control the alignment subsystem before irregular tire wear occurs.

TMF integrated with tires could also be used as a feedback mechanism as part of an actively controlled suspension subsystem on a vehicle. For example, an active control system, using actuators to control the yaw (vehicle motion direction), roll (tire tilt as vehicle turns) and Z position (motion perpendicular to the road, i.e., up/down) of a tire may utilize transducer matrix film as a part of the sensing/feedback system to alter these parameters in real-time. Note that pitch is the tire spin; X and Y do not change relative to the vehicle since the wheel is affixed to the vehicle.

An active suspension may provide an improved (i.e., smoother), more controlled ride than is currently available in the current passive systems. For example, when a bump is encountered the pressure goes up on the tire surface encountering the bump before the force/deflection is transferred to the axle. An active suspension, in response to transducer matrix film data, may lift the wheel up to reduce the transfer of force to the axle. Likewise, the wheel could be pushed down as a pothole is encountered. The vehicle itself remains level as the wheels move up and down conforming to the bumps/holes in the road. Current suspension systems attempt to lessen the up/down movement of the car itself through springs and shocks but an active system could eliminate (or nearly so) the up/down movement of the vehicle. Other vehicle items such as belts and hoses may be instrumented in like manner to tires to determine impending belt failures, monitor coolant temperatures, etc. of cooling subsystems.

In addition to the objects, such as vehicles, discussed herein above, transducer matrix film may be applied to surfaces of objects such as sports equipment (baseballs, footballs, etc.), impellers and duct work to determine mechanical forces such as contact or impact and/or fluid-dynamic (aerodynamic and/or hydrodynamic) forces, such as lift, drag, head loss or buoyancy forces, affecting the object by measuring resultant strain. Data collected from transducer matrix film may be used for design, manufacturing adjustments for specific use, calibration and real-time feedback.

Figure 40:
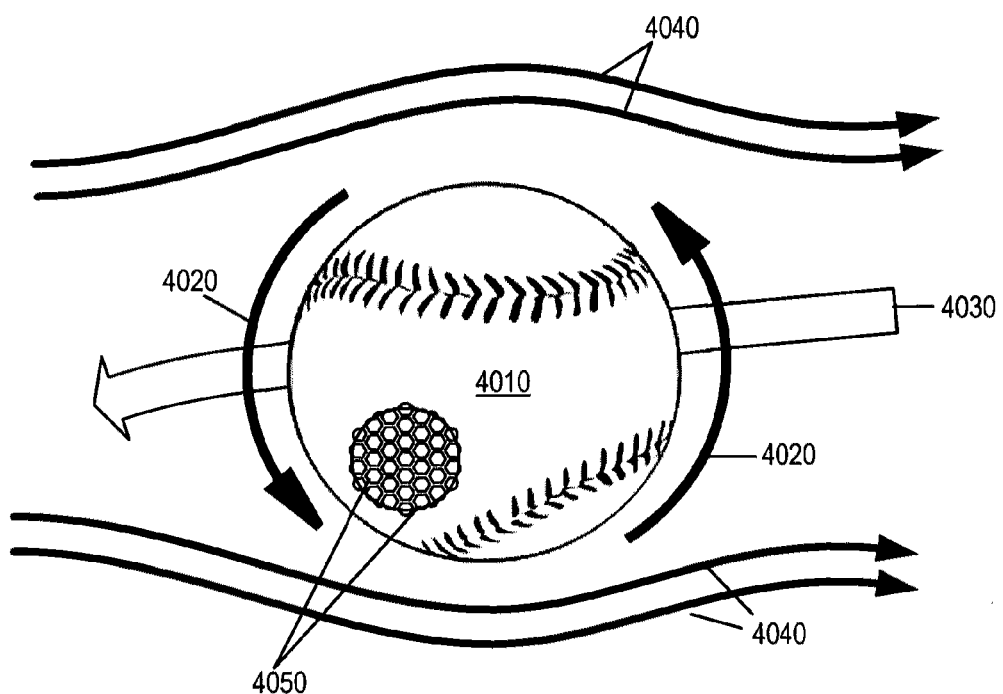
FIG. 40 is a diagrammatic view depicting motion and fluid-dynamics of a baseball including transducer matrix film, in accordance with an embodiment.
Figure 41:
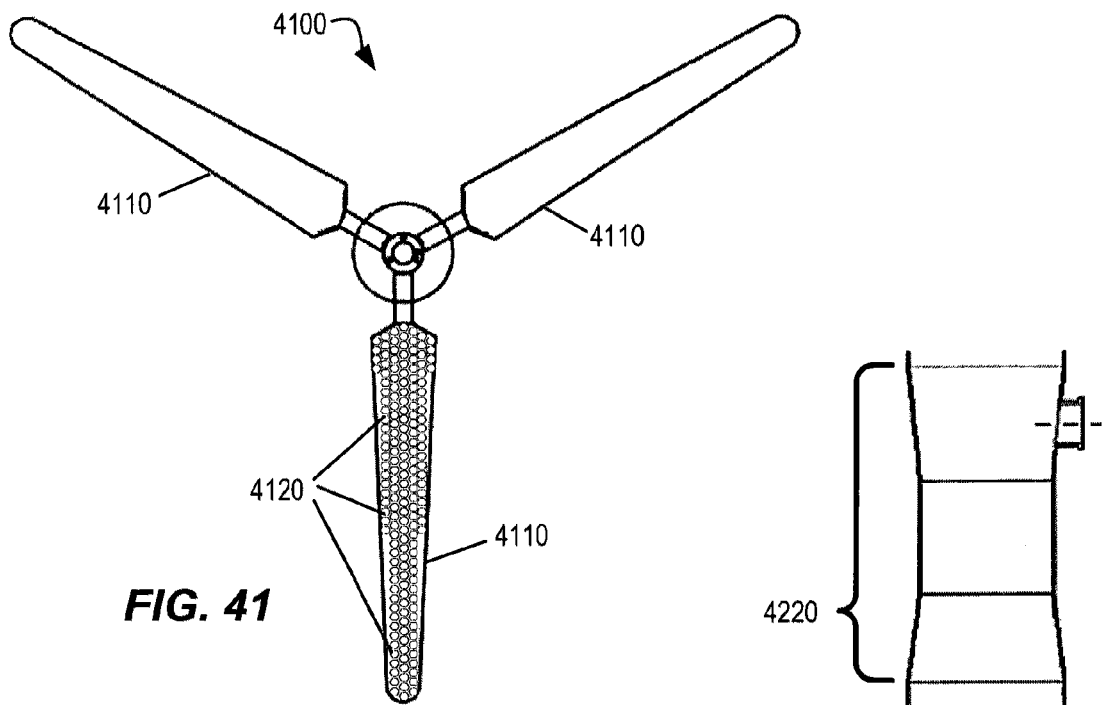
FIG. 41 is a front view of an impeller including transducer matrix film, in accordance with an embodiment.

FIG. 40 shows a diagrammatic view depicting motion and fluid-dynamics of baseball 4010 including transducer matrix film 4050. Ball spin 4020 as well as direction of flight 4030 may be sensed using transducer matrix film designed with accelerometers to sense inertial motion. Air pressure, drag, vortical behavior or other aerodynamic variables of streamlines 4040 may be sensed by transducer matrix film design to measure stress or strain. Likewise, FIG. 41 shows a front view of impeller 4100 with three blades 4110 one of which is shown including transducer matrix film 4120. For an impeller with adjustable blades as part of a power-generating wind turbine, aerodynamic forces effecting power efficiency may be monitored using transducer matrix film 4120 as part of a feedback loop for control of the turbine. Other types of turbines, fans and impeller such as those for jet engines or general air movers may also be instrumented using transducer matrix film.

Figure 42:
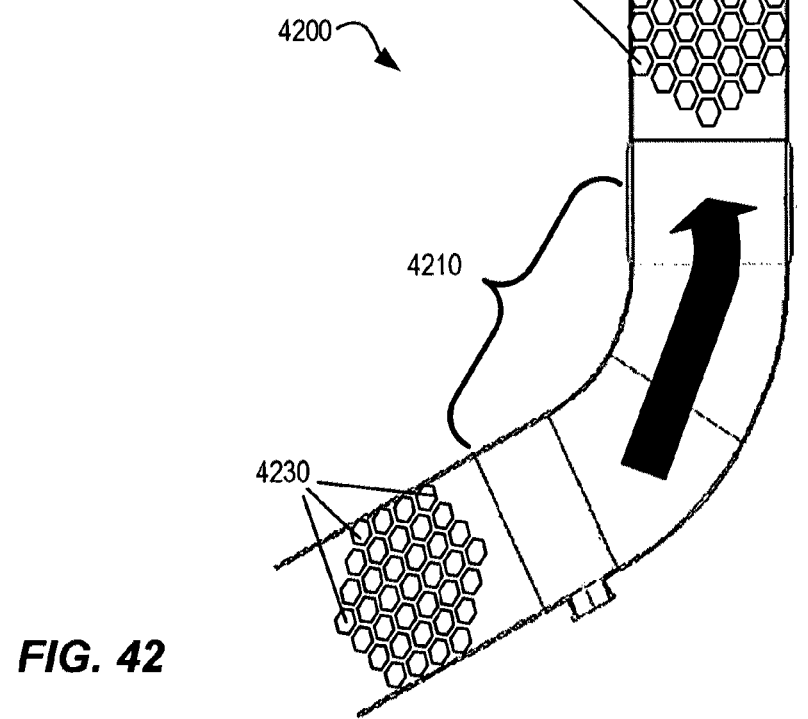
FIG. 42 is a cross-sectional view of a portion of a duct system including transducer matrix film, in accordance with an embodiment.

Furthermore, FIG. 42 shows a cross-sectional view of a portion of duct system 4200 including transducer matrix film portions 4230 and 4240. Within duct system 4200 transducer matrix film 4230 precedes and transducer matrix film 4240 follows a 45 degree region 4210 which creates a pressure drop and flow restriction which may be measured by differential readings from transducer matrix films 4230 and 4240. Aerodynamic effects resultant from narrowing portions such as portion 4220 may also be sensed via transducer matrix film. Other factors such as cavitation and turbulent versus laminar flow may also be sensed using transducer matrix film.

Figure 43:
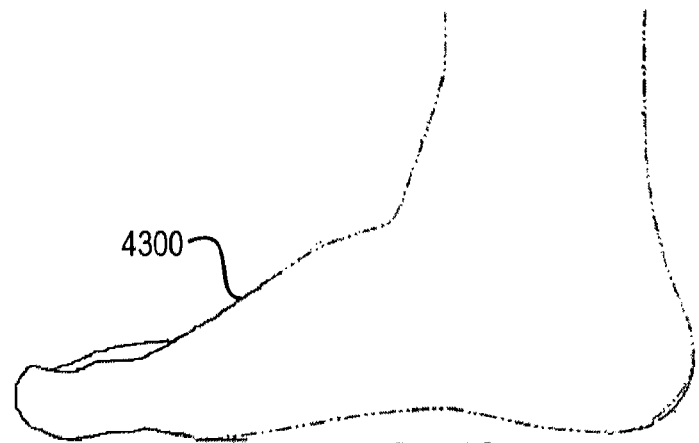
FIG. 43 is a side view of a human foot which may be instrumented by application of transducer matrix film, in accordance with an embodiment.
Figure 44:
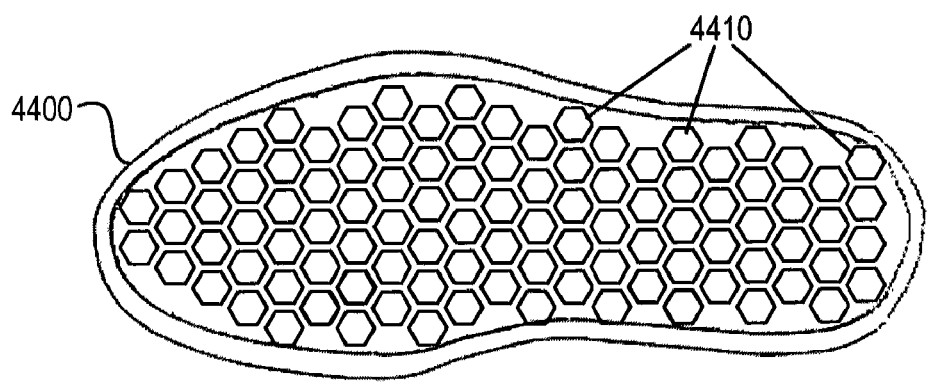
FIG. 44 is a plan view of a portion of a piece of footwear including transducer matrix film, in accordance with an embodiment.
Figure 45:
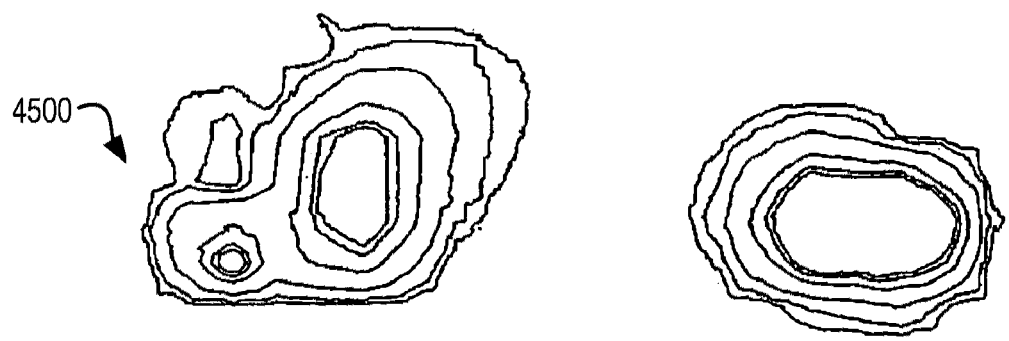
FIG. 45 is a simulated foot pressure contact map measured by transducer matrix film included with footwear of FIG. 44, in accordance with an embodiment.

In addition to the abovementioned articles and medical appliances, transducer matrix film may be used to instrument other portions of a human or animal body. For example, FIG. 43 shows a side view of human foot 4300 which may be instrumented by application of transducer matrix film in the form of footwear as shown in FIG. 44. Footwear 4400 may be a shoe, boot or footwear insert including transducer matrix film 4410. FIG. 45 shows a simulated foot pressure contact map 4500 which may be measured by transducer matrix film 4410 included with footwear 4400 of FIG. 44. Data from transducer matrix film 4410 may be used, in real-time application during use such as walking or running, for determining proper shoe fit and/or designing/evaluating corrective orthotic devices. Likewise, any sleeping or sitting equipment, such as a hospital bed may be instrumented with transducer matrix film to reduce fatigue, bed sores, etc.

Figure 46:
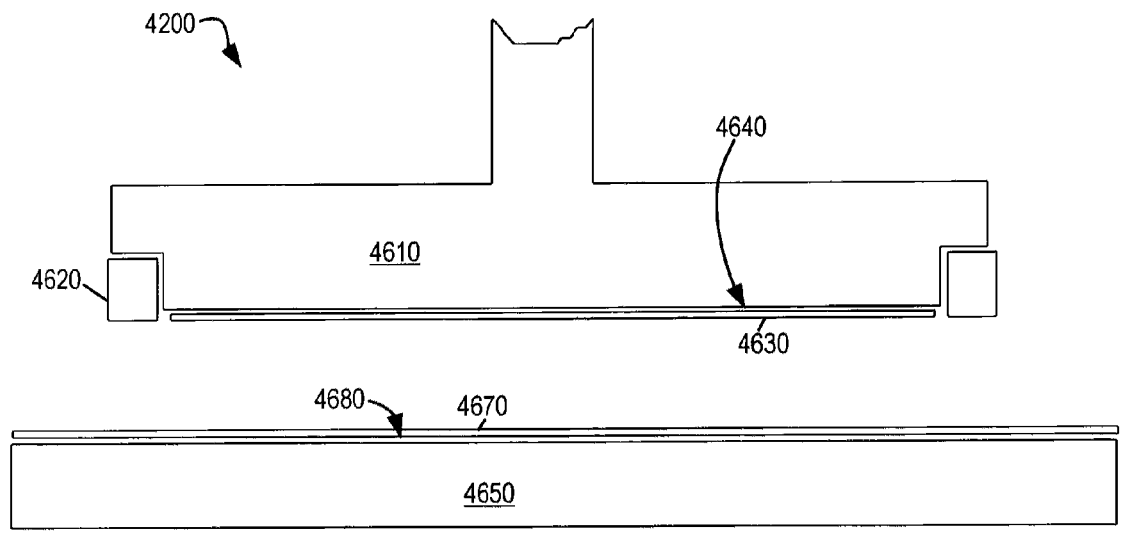
FIG. 46 is a cross-sectional view of a portion of a semiconductor processing machine including transducer matrix film, in accordance with an embodiment.

Industrial systems may also utilize transducer matrix film. FIG. 46 shows a cross-sectional view of a portion of a semiconductor processing machine 4200 including transducer matrix film. Processing machine 4200 may include a wafer carrier 4610 with a retaining ring 4620 which in combination hold semiconductor wafer 4630. Transducer matrix film 4640 may be positioned between semiconductor wafer 4630 and carrier 4610 to sense pressure data for use with a feedback system for controlling localized pressure applied to the wafer. Processing machine 4200 may also include platen 4650 and polishing pad 4670. Transducer matrix film 4680 may be positioned between platen 4650 and pad 4670 to measure temperature, contact pressure, pH or other data. In certain equipment designs, platen 4650 and carrier 4610 each or both rotate and therefore the simplified signal connections provided by transducer matrix film and/or wireless communication simplify integration of the sensor into the system.

Figure 47:
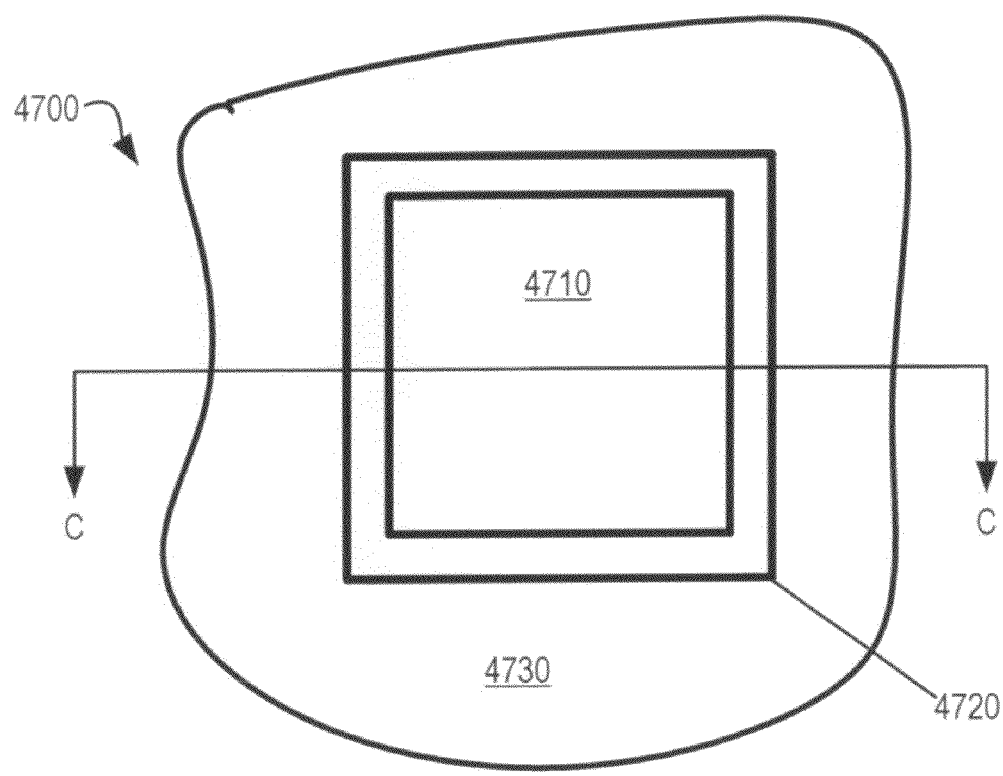
FIG. 47 is a plan view of a portion of transducer matrix film including square transduction cell with integrated photovoltaic material, in accordance with an embodiment.
Figure 48:
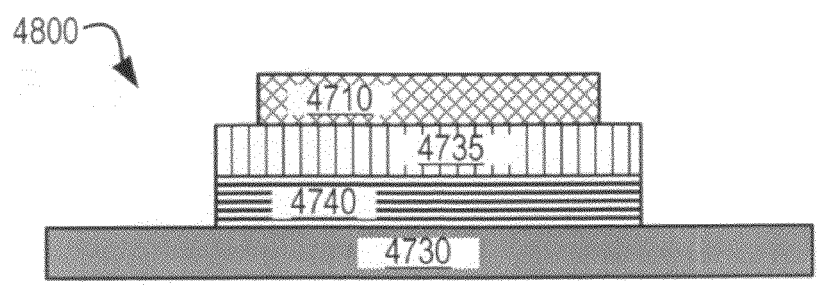
FIG. 48 is a cross-sectional view of a portion of the transducer matrix film of FIG. 47 along section line C-C showing further details of the transducer matrix film, in accordance with an embodiment.

Optionally or additionally, to the constructions described herein above, transducer matrix film may have alternative forms. For example, FIG. 47 shows a plan view of a portion of transducer matrix film 4700 including a square transduction cell 4720 with integrated photovoltaic material 4710 formed on substrate 4730. Photovoltaic material 4710 such as copper indium gallium (di)selenide ("CIGS") or cadmium telluride ("CdTe") may provide power for the elements of transduction cell 4720 such as any transducers, processing circuitry, RF transmitters/receivers or other elements such as described herein. Substrate 4730 may be conductive or non-conductive and no electrical connects are required between transduction cells and each cell may be autonomous. FIG. 48 shows a cross-sectional view of transducer matrix film 4700 of FIG. 47 along section line C-C showing further details of the layers of transducer matrix film 4700. Light may be incident upon either exposed layer including photovoltaic material 4710 and/or substrate 4730. If light is incident upon substrate 4730, then layer 4740 containing processing and transmitters/receivers as well layer 4735 containing any transducers may be at least partially translucent. It should be noted that the layer structure as shown in FIG. 48 is exemplary only and that other orderings of the layers may be used.

Figure 49:
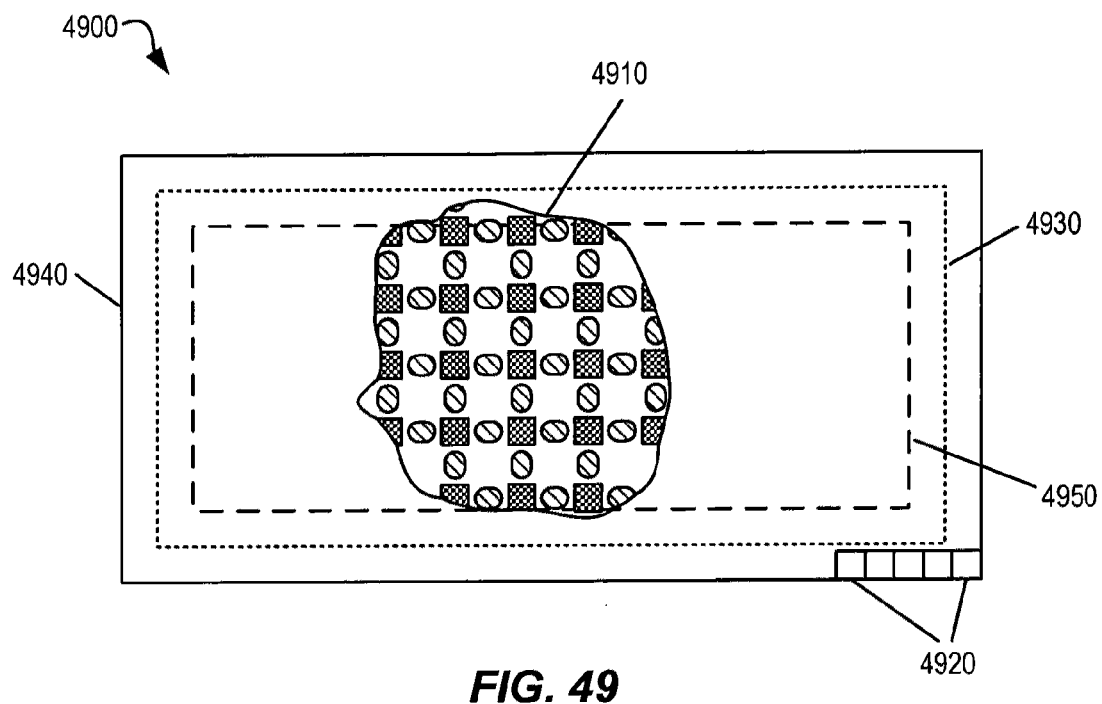
FIG. 49 is a plan view.
Figure 50:
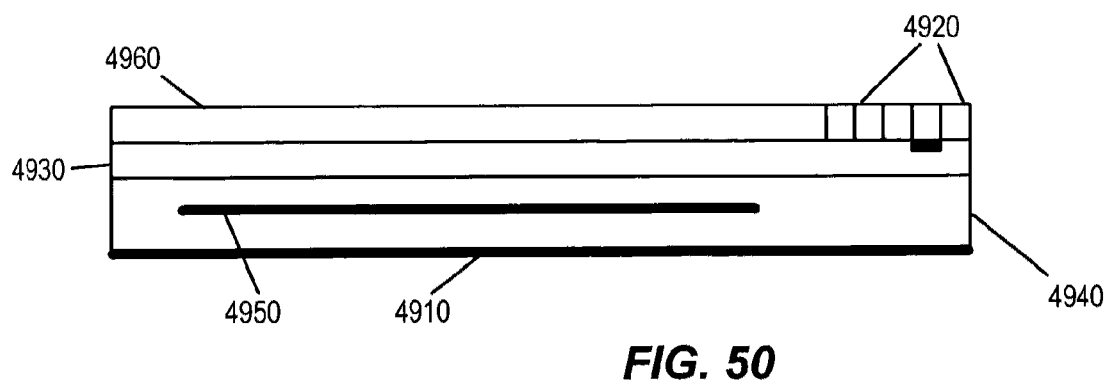
FIG. 50 is a side view, respectively, of a photovoltaic panel including transducer matrix film for monitoring/maintenance/control, in accordance with an embodiment.

In contrast to the above-described inclusion of integrated photovoltaics in TMF; transducer matrix film may be incorporated into or added to photovoltaic systems such as rigid or flexible solar cells. FIG. 49 is a plan view and FIG. 50 is a side view, respectively, of photovoltaic panel 4900 including transducer matrix film 4910, 4920 for monitoring/maintenance/control of photovoltaic panel 4900. Solar cell technologies such as CIGS technology from Nanosolar, CIGS on polyimide from Ascent Solar, silicon ink based technology by Innovalight/JA Solar and/or organic photovoltaics from Global Photonic are examples of systems that may include transducer matrix film. The flexible nature of TMF provides ready integratability for performance monitoring/maintenance/control systems for flexible solar cell technologies.

For monitoring the power and environmental conditions of solar cells, sensors such as strain/pressure sensors, liquid/moisture sensors, humidity sensors and/or temperature sensors included within a portion of TMF may be formed or positioned proximate to or below each solar cell active region 4930 or panel substrate 4940. As shown in a partial cut-away in FIGS. 49 and 50, TMF 4910 may be positioned below (opposite to the surface of incident solar radiation) active region 4930. Alternatively, TMF 4920 may be positioned proximate and above (on the same surface as incident solar radiation) active region 4930 on or below coverplate 4960. TMF including heating elements may be used, for example, to drive off the dew/frost/snow from surfaces of cells or panels to improve or maintain solar radiation collection efficiency. Data and signal processing local to the TMF may provide any necessary/required control of heating elements, sensors and communications to external systems. TMF systems, sensors and/or actuators such as heating elements 4950 may be included or designed into photovoltaic panel 4900 or may be purchased as an accessory product and mounted/affixed as appropriate.

Other than the RF, supercapacitors and photovoltaic means described herein, transducer matrix film may be powered in other ways which do not require batteries or external electrical connections. For example, piezoelectric elements may be included within transducer matrix film or within each transduction cell to provide power when the film is strained. For example, when applied to a sports court activity of players or sports equipment such as a ball induces a strain in a transducer matrix film which in turn is both sensed and the converted into energy such as RF energy for transmitting the sensed data. The transducer matrix film therefore remains quiescent until contacted. Prior cell address coding may permit each cell to respond autonomously regardless of the power state of any other cell.

Energy harvesting from thermoelectric power generation may be used to power transducer matrix film. Thermoelectric semiconductor materials integrated into transducer matrix film may respond to differences in temperature and sense temperature as well as provide extra energy for cell operation. Thermoelectric generation may be used, for example, in application of suits and clothing worn by humans where body temperature is higher or lower than ambient. An example of the available technology to provide thermoelectric power generation for TMF may be seen in a recent announcement from Schneider Electric at a IDTechEx conference where they presented an energy harvesting and voltage conversion system for powering a ZigBee device using a thin film thermo generator where only 3° C. temperature difference generated 126 μW (@ 210 mV) coupled to a standard DC-DC converter with efficiency ~70% to produce 100 μW at 2.4V: from the web at http://www.energyharvestingjournal.com/pages/printarticles.asp?articleids=2386 dated Jun. 22, 2010.

Energy harvesting from mechanical motion may be performed by integrating an inertial sensor into transducer matrix film. An example inertia transducing/sensing device may be formed from a MEMS cantilever and an associated magnet/coil system. Power is generated by motion of the magnet relative to the coils. Inertial power generation may be employed in systems that undergo impacts and changes in acceleration such as for baseballs and basketballs. Inertial power generation may be used in place of batteries or other devices which may affect motion, balance or performance.

Forms of RF energy harvesting or transfer to transducer matrix film may be other than the resonant energy transfer that is commonly used for RFID. RF power transfer may exist at frequencies and bandwidths differing from those used for RF communication. Alternatively, broadband RF energy harvesting may be used such as described in the YahooTECH article titled "Prototype Nokia phone recharges without wires" dated Jun. 16, 2009. Other power generation devices such as the nanogenerator discussed in the article "Improved Nanogenerators Power Sensors Based on Nanowires" developed by the Georgia Institute of Technology ("GIT") may be used to provide power for transducer matrix film. The same article mentioned above for thermoelectric generation provides detail of the zinc oxide on flexible polymer system developed by GIT and powered by heartbeat motion as well as power generators using electroactive polymers, photovoltaic textiles and other methods. Any one or more of the power providing methods and systems described herein may be used independently or in combination to provide power for operation of transducer matrix film.

The changes described above, and others, may be made in the transducer matrix film systems described herein without departing from the scope hereof. For example, although certain examples are described in association with roll-to-roll processing equipment, it may be understood that the transducer systems described herein may be adapted to other types of processing equipment such as industrial presses for metal stamping and for any application where stresses, strains, pressures and/or temperature require measurement.

Furthermore, transducer systems as described herein may include one or more types of transducer matrix film with one or more types of transducer elements. A transducer matrix film may form a self-contained transducer system or external devices may be required for the transducer system. External devices for a transducer system may be permanently or temporarily connected with transducer matrix film. For example, transducer matrix film including temperature sensing elements and heat actuating elements may form a stand-alone thermal transducer system. However, external devices, such as a computer, may require temporary connection to the transducer matrix film for defining temperature set points.

Additionally, although certain embodiments are described herein in association with measurement of stresses, strains, pressures and/or temperature as sensory data, it may be understood that the systems described herein may include other sensors such as optical, magnetic, RF, proximity and/or any other sensor type known in the art or hereinafter developed. Multiple sensors, of the same or different types as those mentioned above, may also be combined within a transducer matrix film system. For example, a system including strain and proximity sensors may be used to determine information such as weight, general shape and contact point geometry of objects. Additionally, the functionality of any transducer matrix film may be modified by substitution of any sensing transducer element for an actuating transducer element of like or different type.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A fault tolerant transducer system comprising: a plurality of transduction cells formed on a flexible substrate, localized circuit elements formed within each of said plurality of transduction cells; a plurality of interconnects associated with said plurality of transduction cells; and means for defining an origin cell, for setting an origin cell address code and for cell address coding provided within each of said plurality of transduction cells wherein the cellular form of said transducer system permits failure of one or more transduction cells within said transducer system without disabling operation of entire said transducer system.

2. A transducer system comprising: a plurality of transduction cells formed on a flexible substrate, localized circuit elements formed within each of said plurality of transduction cells; a plurality of interconnects associated with said plurality of transduction cells; and means for defining an origin cell, for setting an origin cell address code and for cell address coding provided within each of said plurality of transduction cells; said transducer system powered via at least one of the sources selected from the group consisting of piezoelectric sources, thermoelectric sources, photovoltaics, batteries, capacitors, electroactive polymers, photovoltaic textiles, RF power, energy harvesting, inertia systems and nanogenerators.

* * * * *